(12) United States Patent
Eidson et al.

(10) Patent No.: US 10,783,259 B2
(45) Date of Patent: Sep. 22, 2020

(54) METHOD AND APPARATUS FOR LINKED ENCRYPTION TOKENIZATION OF USER TRACEABLE DATA

(71) Applicant: salesforce.com, inc., San Francisco, CA (US)

(72) Inventors: William C. Eidson, Palo Alto, CA (US); David Hacker, Moraga, CA (US); Yu Chen, Bellevue, WA (US); Michael Goldberg Boilen, Kirkland, WA (US); Shakti Prakash Das, Hyderabad (IN)

(73) Assignee: salesforce.com, inc., San Francisco, CA (US)

(*) Notice: Subject to any disclaimer, the term of this patent is extended or adjusted under 35 U.S.C. 154(b) by 210 days.

(21) Appl. No.: 16/051,403

(22) Filed: Jul. 31, 2018

(65) Prior Publication Data

US 2019/0342088 A1 Nov. 7, 2019

Related U.S. Application Data

(60) Provisional application No. 62/676,268, filed on May 24, 2018, provisional application No. 62/666,661, filed on May 3, 2018.

(51) Int. Cl.
*G06F 21/62* (2013.01)
*G06F 21/60* (2013.01)
(Continued)

(52) U.S. Cl.
CPC ............ *G06F 21/602* (2013.01); *G06F 9/542* (2013.01); *G06F 11/3072* (2013.01);
(Continued)

(58) Field of Classification Search
CPC ......... H04L 67/22; H04L 9/0861; H04L 9/14; H04L 2209/42; H04L 63/00;
(Continued)

(56) References Cited

U.S. PATENT DOCUMENTS 7,730,478 B2   6/2010   Weissman
8,706,715 B2   4/2014   Eidson et al.
(Continued)

FOREIGN PATENT DOCUMENTS

EP   2715519 B1   4/2019

OTHER PUBLICATIONS

Wikipedia, "Tokenization (data security)", retrieved from the Internet: https://en.wikipedia.org/wiki/Tokenization_(data_security), Nov. 2, 2017, 6 pages.
(Continued)

*Primary Examiner* — Olugbenga O Idowu
(74) *Attorney, Agent, or Firm* — Nicholson De Vos Webster & Elliott LLP

(57) ABSTRACT

A method and apparatus for tokenization of user-traceable data are described. User traceable data is data that is not directly personal data but can be traced back to the identity or an activity of the user. A first raw value is encrypted into a first token using a symmetric key encryption mechanism based on a combination of a second raw value including personal data of a user and a second token resulting from the tokenization of the second raw value where the first token is an anonymized representation of the first raw value.

18 Claims, 18 Drawing Sheets

(51) Int. Cl.
  *H04L 29/06* (2006.01)
  *G06F 9/54* (2006.01)
  *H04L 9/08* (2006.01)
  *G06F 11/30* (2006.01)
  *G06F 11/34* (2006.01)
  *H04L 9/32* (2006.01)
  *H04L 9/14* (2006.01)
  *H04L 29/08* (2006.01)

(52) U.S. Cl.
  CPC .......... *G06F 11/3476* (2013.01); *G06F 21/62* (2013.01); *G06F 21/6254* (2013.01); *H04L 9/0861* (2013.01); *H04L 9/0891* (2013.01); *H04L 9/14* (2013.01); *H04L 9/3213* (2013.01); *H04L 9/3234* (2013.01); *H04L 63/108* (2013.01); *H04L 63/20* (2013.01); *H04L 67/22* (2013.01); *G06F 2221/2141* (2013.01)

(58) Field of Classification Search
  CPC ..... H04L 63/108; H04L 9/088; H04L 9/0891; G06F 21/62; G06F 21/6254; G06Q 20/385
  See application file for complete search history.

(56) References Cited

U.S. PATENT DOCUMENTS

| | | | |
|---|---|---|---|
| 8,930,380 B1 | 1/2015 | Saurabh et al. | |
| 9,058,361 B2 | 6/2015 | Jasik et al. | |
| 9,195,438 B2 | 11/2015 | Toens et al. | |
| 9,195,724 B2 | 11/2015 | Mathrubootham | |
| 9,201,939 B2 | 12/2015 | Weissman et al. | |
| 9,292,707 B1* | 3/2016 | Fontecchio | H04L 9/30 |
| 9,304,614 B2 | 4/2016 | Kwong | |
| 9,405,797 B2 | 8/2016 | Eidson et al. | |
| 9,600,512 B2 | 3/2017 | Gasn et al. | |
| 9,628,493 B2 | 4/2017 | Warshavsky et al. | |
| 9,632,852 B2 | 4/2017 | Kwong et al. | |
| 9,740,743 B2 | 8/2017 | Jagota et al. | |
| 9,824,108 B2 | 11/2017 | Taylor et al. | |
| 10,162,851 B2 | 12/2018 | Eidson et al. | |
| 10,198,463 B2 | 2/2019 | Eidson et al. | |
| 10,235,476 B2 | 3/2019 | Vaishnav et al. | |
| 10,296,440 B2 | 5/2019 | Gamble et al. | |
| 10,382,463 B2 | 8/2019 | Yan et al. | |
| 10,397,309 B2 | 8/2019 | Wunderlich et al. | |
| 10,528,370 B2 | 1/2020 | Kwong | |
| 2008/0010243 A1 | 1/2008 | Weissman et al. | |
| 2011/0238622 A1 | 9/2011 | Walters et al. | |
| 2011/0264668 A1 | 10/2011 | Hacker et al. | |
| 2012/0215707 A1 | 8/2012 | Kwong et al. | |
| 2016/0085792 A1 | 3/2016 | Dukes et al. | |
| 2018/0285426 A1 | 10/2018 | Chow et al. | |
| 2019/0332807 A1* | 10/2019 | LaFever | G06F 21/6254 |
| 2019/0340368 A1 | 11/2019 | Eidson et al. | |
| 2019/0340388 A1 | 11/2019 | Eidson et al. | |
| 2019/0342088 A1 | 11/2019 | Eidson et al. | |

OTHER PUBLICATIONS

Non-Final Office Action, U.S. Appl. No. 16/051,390, dated Mar. 6, 2020, 6 pages.

Notice of Allowance, U.S. Appl. No. 16/051,390, dated Jun. 9, 2020, 5 pages.

Notice of Allowance, U.S. Appl. No. 16/051,414, dated Apr. 20, 2020, 9 pages.

Notice of Allowance, U.S. Appl. No. 16/051,414, dated Jun. 5, 2020, 8 pages.

\* cited by examiner

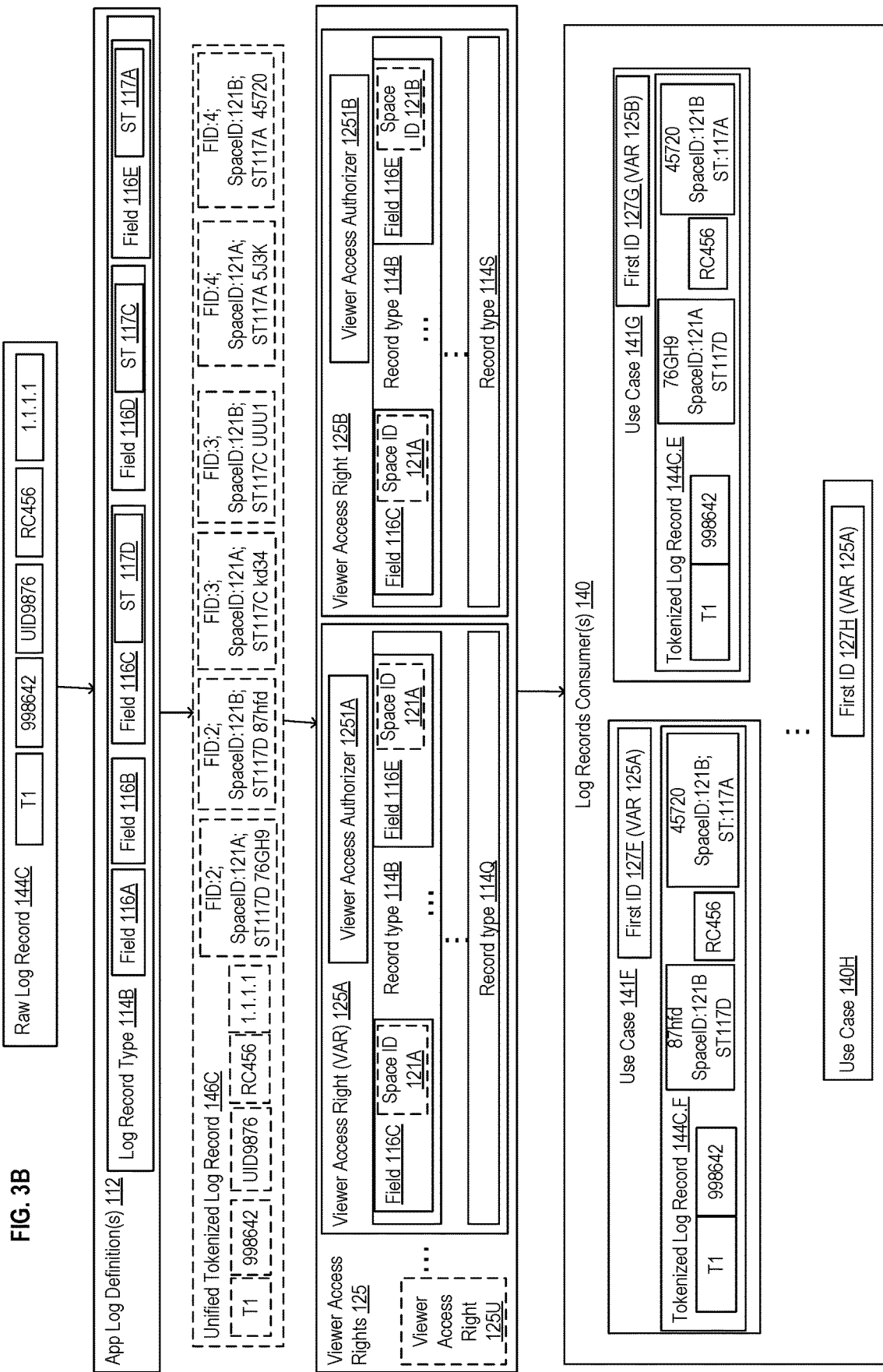

RECEIVE A SECOND RAW LOG RECORD THAT IS OF A SECOND OF THE PLURALITY OF LOG RECORD FORMATS AND THAT STORES IN A SECOND SPECIFIC PLURALITY OF FIELDS SECOND RAW PIECES OF THE DATA THAT RELATE TO A SECOND EVENT THAT OCCURRED IN A SECOND ONE OF THE SET OF APPLICATIONS, WHERE THE SECOND LOG RECORD FORMAT IS DIFFERENT FROM THE FIRST LOG RECORD FORMAT
502

DETERMINE, BASED ON THE SECOND LOG RECORD FORMAT BEING OF A SECOND OF A PLURALITY OF LOG RECORD TYPES THAT IS DIFFERENT FROM THE FIRST OF A PLURALITY OF LOG RECORD TYPES, THAT A SECOND FIELD FROM THE SECOND RAW LOG RECORD IS TO BE TOKENIZED BASED ON A SECOND TOKENIZATION STRATEGY OF THE PLURALITY OF TOKENIZATION STRATEGIES IDENTIFIED IN THE SECOND LOG RECORD TYPE
504

GENERATE FOR A SECOND RAW VALUE IN THE SECOND FIELD OF THE SECOND RAW LOG RECORD A SECOND TOKEN THAT IS AN ANONYMIZED REPRESENTATION OF THE SECOND RAW VALUE USING A SECOND TOKENIZATION MECHANISM IDENTIFIED BY THE SECOND TOKENIZATION STRATEGY IN THE SECOND LOG RECORD TYPE
506

OUTPUT A SECOND TOKENIZED LOG RECORD GENERATED BASED ON THE SECOND RAW LOG RECORD AND THE SECOND TOKEN TO BE USED BY ONE OR MORE OF THE PLURALITY OF LOG RECORD CONSUMERS
508

FIG. 5

METHOD AND APPARATUS FOR LINKED ENCRYPTION TOKENIZATION OF USER TRACEABLE DATA

CROSS-REFERENCE TO RELATED APPLICATIONS

This application claims the benefit of U.S. Provisional Application No. 62/676,268, filed May 24, 2018, and U.S. Provisional Application No. 62/666,661, filed May 3, 2018, which are hereby incorporated by reference.

TECHNICAL FIELD

One or more implementations relate to the field of log records recordation in computing systems; and more specifically, to linked encryption tokenization of user traceable data.

BACKGROUND ART

A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. The term "user" is a generic term referring to an entity (e.g., an individual person) using a system and/or service. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

When a user uses a system or a service, they may have sensitive data accessible to the service and/or system. The sensitive data can be stored or used by different components of the service and system for different purposes. For example, to enable auditing, debugging, or security compliance, log records related to events resulting from the operations of the service or system may be recorded. The log records include fields with data. The data can include sensitive data such as personal data of a user (e.g., a name of the user, a user identifier of the user, an address of the user, an email address of the user, etc.). There is a need to protect access to and retention of the sensitive data of the user to enforce data protection and privacy for this user.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

FIG. 3B illustrates a block diagram of exemplary use of a policy for generation of tokenized log records in accordance with some implementations.

FIG. 5 illustrates a flow diagram of exemplary operations for enabling multiple log record consumers to comply with regulations and requirements regarding privacy and handling of data when a second raw log record is to be tokenized according to one implementation.

DETAILED DESCRIPTION

The following description describes methods and apparatus for handling personal data in log records of a system. In one implementation, a method and a system for enabling multiple log record consumers to comply with regulations and requirements regarding privacy and handling of data are described. A set of one or more applications have access to data and generate raw log records responsive to events that occur in the set of applications. The set of applications are expected to generate multiple raw log records that each stores pieces of the data that relate to an event that occurs in the set of applications. Each of the raw log records is of one of multiple log record formats. Each of the log record formats includes a specific set of fields for storing different pieces of the data to which the set of one or more applications have access.

A raw log record is received. The raw log record is of a first log record format that stores in the specific set of fields raw pieces of the data that relate to an event that occurred in one of the set of applications. A determination, based on the log record format being of a first of the log record types, that a first field from the raw log record is to be tokenized based on a first tokenization strategy of multiple tokenization strategies in the first log record type, is performed. Each one of the tokenization strategies identifies a tokenization mechanism from multiple tokenization mechanisms to be used for generating a token from a raw value to enable compliance with a respective set of regulations and requirements regarding privacy and the handling of data. Each one of the log record types specifies which one or more of the tokenization strategies to apply to one or more of the specific plurality of fields of one of the plurality of record formats. For a first raw value in the first field of the raw log record a first token is generated. The first token is an anonymized representation of the first raw value using a first tokenization mechanism identified by the first tokenization strategy in the log record type. A tokenized log record generated based on the raw log record and the first token is output to be used by one or more of the log record consumers.

Figure 1A:
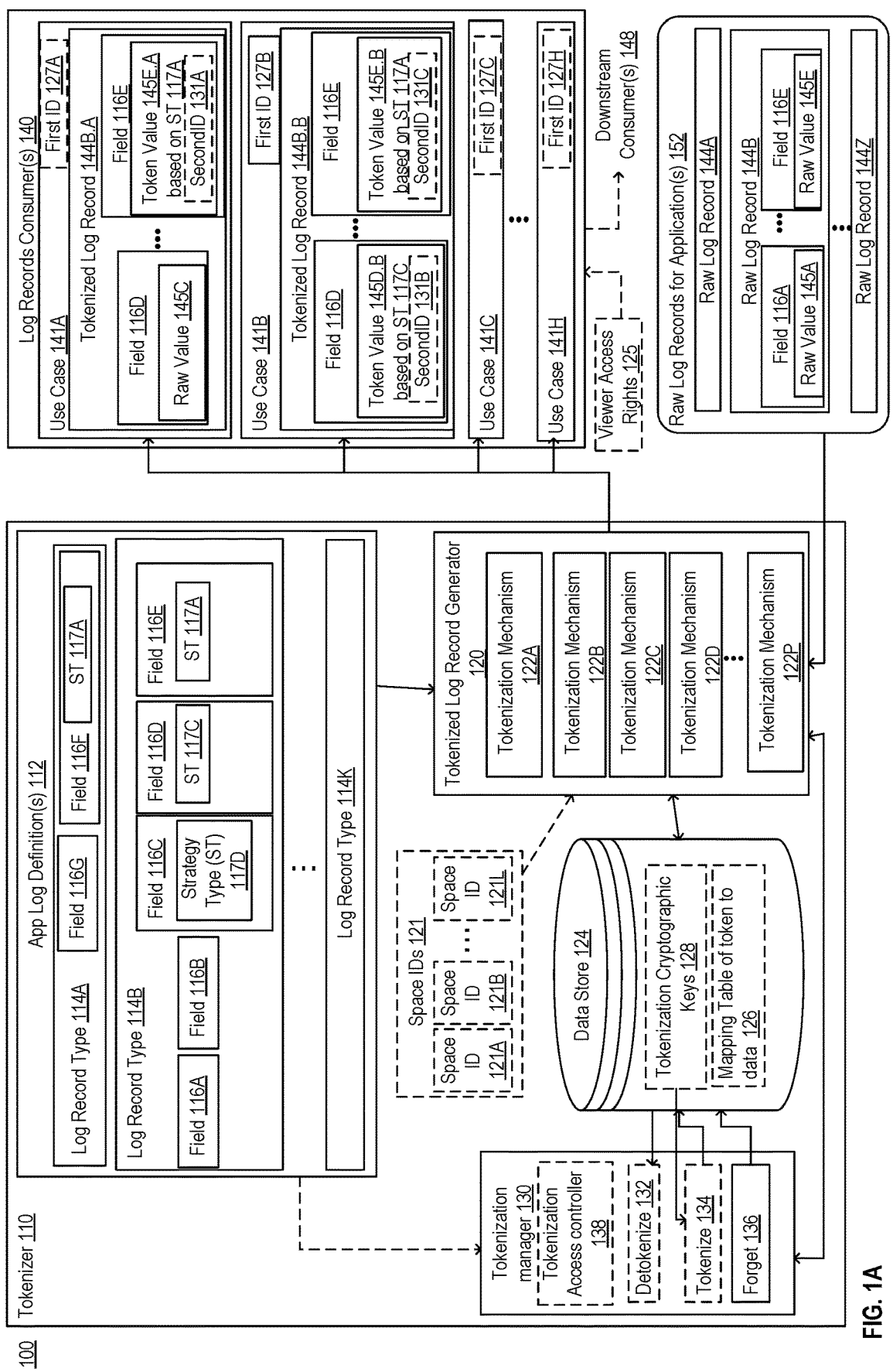
FIG. 1A illustrates a block diagram of a system for enabling multiple log record consumers to comply with regulations and requirements regarding privacy and handling of data according to one implementation.

FIG. 1A illustrates a block diagram of a system 100 for enabling multiple log record consumers to comply with regulations and requirements regarding privacy and handling of data according to one implementation. The system 100 includes a tokenizer 110 and log record consumers 140.

The tokenizer 110 includes a tokenizer log record generator (TLRG) 120, an app log definition(s) 112, a data store 124, and a tokenization manager 130. The log consumer(s) 140 include one or more use cases 141A-H. The tokenizer 110 is operative to receive raw log records for application(s) 152 (e.g., raw log record 144B) and process the raw log records to generate tokenized log records (e.g., 144B.A, 144B.B) which are consumed by one or more of the use cases 141A-H of the log record consumer(s) 140 (e.g., use case 141A consumes tokenized log record 144B.A and use case 141B consumes tokenized log record 144B.B).

The raw log records 152 include information related to events that occur in one or more application(s). The raw log records 152 are generated by one or more applications (not shown) that are operative to communicate with the tokenizer 110. Each one of the raw log records 152 stores pieces of the data that relate to an event that occurs in one of the set of applications. Each of the raw log records 152 is of one of multiple log record formats. Each of the log record formats includes a specific set of fields for storing different pieces of the data to which the set of one or more applications have access. Each one of the raw log records stores in the specific set of fields raw pieces of the data that relate to an event that occurred in one of the set of applications. In one implementation, a single application can record log records of a given format (e.g., a log record of a format identified with a log record type from the set of log record types 114A-K). For example, this scenario may occur when an event can only occur in a single application. In other implementations, multiple applications can record log records of the same format. This scenario may occur when the same type of events may occur in multiple applications.

In some implementations, each one of the raw log records 152 is a time-stamped information that is automatically produced when an event occurs during the execution of an application from the application(s). For example, each of the raw log records 152 can include information related to actions performed by a user when using the application (e.g., a user accessing a user account, an operation performed in the user account (e.g., viewing a file, entering data, including a comment in a social network, etc.), automatic operations performed during the execution of the application (termination of a process, error(s) that occur in the application, etc.), messages received at or transmitted from the application. Additionally or alternatively, the raw log records 152 can be transaction logs including information on changes to data stored in databases, which allow the database to recover from crashes or other data errors and maintain the stored data in a consistent state.

The raw log records 152 may include data that may be considered sensitive data such as personal data. Broadly speaking, the term "Personal Data" can be defined as any information relating to an identified or identifiable person. The personal data can include a name of a person (the person being the user of the application or a person related to the user of the application), contact information of a person (such as a physical or email address of the person or a telephone number of the person), a user identifier (referred herein as UserID) uniquely identifying a user of an application, an IP address associated with a device used by the user to access the application, or any other information that is related to the person which can be obtained or used by an application and logged in a raw log record. In some implementations, a distinction can be made between personal data that uniquely identifies the user (such as the name of the person) or renders the user identifiable (such as a user identifier) and user traceable data. User traceable data is data that is not directly personal data (i.e., does not directly identify the user or make the user identifiable) but can be traced back to the identity or an activity of the user (e.g., an IP address of a device used by the user, a mailing address of the user if the user is not the only person living at that address, etc.).

The raw log records 152 may include other types of data that is not considered as personal data (such as number of files accessed, types of errors that occur in an application, a name of a process terminated, etc.). In some implementations, the raw log records 152 include one or more log files, where each log file is received from an application and includes information on one or more events that occurred during the execution of the application.

The log records consumers 140 may be one or more log records consumers that are operative to store and/or ingest the tokenized log records. Each one of the log record consumers may include one or more use case 141A-141H. Each of the use cases 141A-H stores and/or processes log records. The use cases 141A-H may store/process raw log records and/or tokenized log records. A use case from the use cases 141A-H is a sub-system or logical set of a service offered for users/customers. More generally the use cases 141A-H can be software run environment used for gaining insight on the operations and actions performed in the applications. For example, the use cases 141A-H can be used for performing one or more of audit, debug and support, forensic and compliance, and/or analytics of the applications.

One of the use cases 141A-H can enable auditing of the application for which the records are generated. Auditing provides information about use of the system, which can be critical in diagnosing potential or real security issues. The use cases can be used to obtain insight on the logs recorded for the application (e.g., usage analytics, security analytics, etc.). The use cases 141A-H can be used for debugging the applications for which the raw log records were recorded. The use cases can also be used to store the tokenized log records for a period of time and may provide access to downstream consumers 148 that can implement debugging, data analytics, security and compliance applications.

In a non-limiting example, a use case can be a data lake. A data lake is a storage repository holding a large amount of data that remains in a native format until it is needed. A data lake uses a flat architecture to store data. For example, the data lake may store the tokenized log records for a predetermined period of time. The data lake can be queried by downstream consumer(s) 148 for relevant data, and that smaller set of data can then be analyzed. In another example, a use case can be a log analyzer, a big data processor, or a stream processor, a security Analytics event storage, etc.

Each one of the use cases 141A-H is to comply with a specific set of regulations and requirements regarding privacy and the handling of personal data. These regulation and requirements define a policy for using and/or storing the log records. The policy defines how the data is to be stored, viewed, tokenized, detokenized, if and how data can be forgotten in the system, which user can access the data, and/or how the data is to be retained in the system and for how long. As it will be described in further details below, the compliance of the different use cases to their respective policy is enabled through the multiple elements of the system 100. For example, the elements of the tokenizer 110, the viewer access rights 125, the first IDs 127 and the second IDs 131, the space IDs 121 enable compliance of a user of the use case with the policy (i.e., with the regulations and requirements regarding privacy and personal data handling) when using log records.

Each use case 141A-H is associated with a respective first ID 127A-H. In a first implementation, each of the first IDs 127A-H includes an identifier of a space, e.g., one of space IDs 121A-L. In this implementation, each use case operates per space such that each tokenized log record used by the use case is tokenized in a single space identified by a single space ID. When the first ID 127 is a space ID the second ID 131 is not used.

In a second implementation, each of the first IDs 127A-H includes an identifier of the viewer access rights 125. In this implementation, the use case operates based on a policy identified at least in part based on the first ID such that the tokenized log records used by the use case are defined based on viewer access rights 125 that define for each tokenized field of the tokenized log record the space in which this tokenized field is to be viewed. The viewer access rights may also identify the log record types that can be accessed by a user of the use case as it will be described in further details with FIG. 3B. In this implementation, each field of a tokenized log record can be tokenized based on a second ID (e.g., 131A). The second ID can indicate a space ID from space IDs 121. Fields of a tokenized log record can be tokenized in the same space, or alternatively in different spaces (e.g., field 116D of 144B.B is tokenized based on second ID 131B indicating a first space and field 116E of 144B.B is tokenized based on a second ID 131C indicating a second space). In a third implementation, a use case can be operative to determine which of a space ID or a viewer access right ID is to be used as the first ID 127A. In this implementation, a use case is operative to be configured to use one of a space ID or user access right ID to tokenize the log records based on configuration parameters.

In some implementations, when using the tokenized log records a use case is only aware of the space in which each field is tokenized. In other implementations, when using the tokenized log records a use case is aware of the space and the tokenization mechanism used for tokenizing the data. For example, when a use case acts as a definer of a log record type in the app log definitions 112, the use case is aware of which strategy is to be applied to a field.

The tokenizer 110 further includes an App Log Definition(s) 112. The App Log Definition(s) 112 includes one or more log record types 114A-K. Each log record type represents a template/format of a log record that may be recorded as a result of an event that occurs in one or more application(s). Each one of the log record types 114A-K includes a specific set of one or more fields. For example, log record type 114A includes the field 116F and the field 116G. In another example, the log record type 114B includes a set of fields 116A-E. Each field of a log record type indicate a format/type of a field of raw log records that is to store data related to the event that occurred in the application. In some implementations, the app log definition(s) 112 is updated (e.g., a new log record type is defined or an existing log record type is modified/deleted) by one or more log consumers 140 based on one or more use cases 141A-H. In some implementations, the app log definition(s) 112 can be updated by an administrator that is different from a user of the log record consumers. In one implementation, the app log definition(s) 112 is centralized and includes log record types 114A-K defined for the multiple log record consumers 140. In some implementations, the app log definitions 112 provides an efficient, centralized, and declarative technique of enabling tokenization of raw data in fields of raw log records (such as raw log records 144A-Z). The app log definitions 112 is in a centralized location, such that the log record types are used for tokenization of data for multiple applications that are generating the raw log records 152. Further, the centralized location makes the log record types accessible to all log record consumers, e.g., the centralized location enables the log record consumers to add, modify, and/or delete log record types, tag fields of the log record types with tokenization strategies such that a field of multiple records of the same format will be tokenized based on the same tokenization mechanism for a plurality of log record consumers. In some implementations, the TLRG 120 is also part of the centralized location such that tokenized records are also generated in this centralized location and provided to a set of one or more log record consumers.

A field that is to be tokenized for one or more of the use cases 141A-H is associated with a tokenization strategy, which is also referred to herein as tokenization Strategy Type (ST) that enables the identification of a tokenization mechanism that is to be applied to data of that field. For example, fields 116C, filed 116D, and field 116E are associated with a respective strategy type ST 117D, 117C, and 117A. Each strategy type identifies a respective tokenization mechanism from the set of tokenization mechanisms 122A-P in the tokenized log record generator 120. For example, ST 117A uniquely identifies the tokenization type 122A, ST 117C uniquely identifies the tokenization mechanism 122C, and ST 117D uniquely identifies the tokenization mechanism 122D. In some implementations, each of the log record types 114A-K is a schema and a set of attributes (e.g., type of data, tokenization strategy, etc.). A tokenization mechanism is a process for determination of a token for a raw value where the token is an anonymized representation of the raw value. Tokenization of a value enables consumers of the data (e.g., log record consumers 140) to use the data for multiple purposes (e.g., debugging, security, analytics, etc.) while having a regulated access to sensitive data (e.g., personal data and/or user traceable data). The regulation of the access is determined based on the policy chosen for a use case. While some use cases can only view/use the tokenized data and may not access the raw data from which the tokenized data was generated, other use cases may access the raw data based on certain criteria (e.g., for a determined period of time, access is granted only to some users of the use case, access can be provided upon request, etc.).

Each log record type includes a specific set of fields and each field includes an attribute with a strategy type. The strategy type is used when determining the tokenization mechanism to be performed on data of the field. In some implementations, the attributes are added to log record types by having one or more users (e.g., use case, an administrator of the system, a user of a use case, an application for which the log records are generated, a user of the application) to tag fields of a log record type with identifiers, where each identifier uniquely identifies the strategy of tokenization that is to be applied for tokenizing a value of the field. In a non-limiting implementation, the app log definition(s) 112 is an XML document including one or more log record types as elements.

In one implementation, the strategy for tokenizing a field is selected when creating the log record types for the applications. In some implementations, selecting a strategy is based on the current available strategies supported by the system 100 and downstream consumers. In some implementations, to ensure that compliance with one or more regulation and requirements is achieved, a new tokenization mechanism can be subject to a validation process performed in collaboration with one or more teams within the administrative entity of the system (e.g., involving a legal department through the validation process) prior to being implementation.

A non-limiting example of log record type can be log record type 114B including fields 116A-E. In a non-limiting example, the log record type 114B can be a type of a record that is recorded by an application when a user of a database accesses a record of the database. The log record type may include the following fields: a timestamp indicating a time at which the log record is recorded (in some implementations, this can correspond to a time at which the user has accessed the record), an organization identifier (orgId), a user identifier (userId) uniquely identifying the user accessing the database, a record identifier uniquely identifying the accessed record (recordId), and an IP address assigned to the network device used by the user (IP-address). In this non-limiting example, field 116A indicates that a log record of type 114B includes a timestamp as its first field; the field 116B indicates that the log record of type 114B includes an orgId as its second field, field 116C indicates that a log record of type 114B includes a userId as its third field, field 116D indicates that a log record of type 114B includes a recordId as its fourth field, and field 116E indicates that a log record of type 114B includes an IP-address as its fifth field. While exemplary log record type 114B is illustrated with fields 116A-E, in other implementations log record type 114B can include additional fields that may be recorded when a user accesses a record of a database. Several examples of log records types can be contemplated where different numbers and types of fields can be included in a log record type than the one illustrated in the non-limiting exemplary log record type 114B.

The tokenized log record generator 120 includes one or more tokenization mechanisms 122A-P. Each of the tokenization mechanism 122A-P is operative to receive raw log records 152 and process them based on the log record types 114A-K to obtain tokenized log records (e.g., 144B.A-144B.B) to be stored/processed by the log record consumers 140. In some implementations, in addition to the log record types 114A-K, the tokenization mechanisms 122A-P may further consider the space IDs 121 when processing the raw log records 152. While the implementations will be described with reference to the exemplary log record 144A and log record 144B of type 114A and 114B respectively, other types of records can be contemplated. The TLRG 120 receives the raw log record 144B and based on the type of the log record 114B a tokenization mechanism is selected for each field of the raw log record that needs to be tokenized. For example, the tokenization mechanism 122D is chosen based on the ST 117D for field 116C of the raw log record 144B. The tokenization mechanism 122C is chosen based on the ST 117C for field 116D of the raw log record 144B. The tokenization mechanism 122A is chosen based on the ST 117A for field 116E of the raw log record 144B. In some implementations, the tokenized log record generator 120 may access the space IDs 121 to determine one or more space IDs in which a field of a record is to be tokenized.

The tokenization manager 130 enables users of the system to tokenize 134, detokenize 132, or forget 136 the data when proper access rights have been granted to the user. Tokenization is the process of generating from a raw value a token that is an anonymized representation of the raw value such that when the token used no information can be obtained on the original raw data. Detokenization is the process of reversing the tokenization performed to generate a token to obtain the raw value from which the token was generated. Forgetting user data is the process of forgetting any data related to the user and the user's activity by making it inaccessible (i.e., deleting the data or making the data completely anonymized such that the identity of the user or information about activity of the user cannot be retrieved from tokenized data) upon receipt of a request to forget the user. The request can be from the user or from another entity. Some regulations and requirements regarding privacy and the handling of sensitive data set a time limit after which a request to be forgotten must be complied with. While some implementations may comply with a request to be forgotten relatively quickly, and thus well within this time limit; alternative implementations may comply more slowly (e.g., closer to end of such a time limit). In fact, within a single implementation this may vary based upon the tokenization strategies. The ability to respond to a request to forget a user is referred as an ability to support the right to be forgotten (RTBF).

In some implementation, the tokenization manager 130 enables users to access the mapping table of token to data 126 and/or the tokenization cryptographic keys 128. The tokenization access controller 138 determines authorization of access to perform the operations 132, 134, or 136 based on one or more of the identification of the user attempting to perform the operation (e.g., the user can be a user of the log consumers, a use case, a log consumer, a user that is the owner of the personal data, etc.), the space ID in which the token was generated, and the strategy mechanism with which the token was generated. In additional or alternative implementations, the access authorization can further be based on the type of log record, the field that is to be accessed, the use case attempting the access, a time at which the access is attempted.

As opposed to the tokenization of raw log records performed in the tokenized log record generator which performed automatically upon receipt of the multiple raw log record, the tokenization manager 130 enables a user (e.g., an admin, a user of the use cases of log record consumers) to explicitly request tokenization of a raw field, detokenization of a token, or request that a user be forgotten in the system (e.g., in the log record consumers 141). Thus, this tokenization, detokenization or forgetting is punctual and is performed in response to a request. The access to the detokenize 132, tokenize 134, or forget 136 is performed in response to the determining that the user making the request is authorize. For example, the access controller 138 may determine based on login credentials (username, password) whether the user is authorize one or more of the operations of the tokenization manager 130. When the access is authorized, a key, token value, or raw data is sent to consumers depending on authorization levels for the consumer.

In operation the system 100 enables the log record consumers to comply with regulations and requirements regarding privacy and handling of data. The set of applications (not illustrated) that have access to data generate raw log records 152 responsive to events that occur in the set of applications. Each one of the raw log records 152 stores pieces of the data, e.g., the raw values 145A-E of the fields 116A-E, that relate to an event that occurs in the set of applications. The raw log records 152 are received by the tokenizer 110. Each one of the raw log records 152, e.g., raw log record 144B is of one of multiple log record formats identified by a log record type 144A-K, where each of the record formats includes a specific set of fields for storing different pieces of the data to which the set of applications have access.

The tokenizer 110, receives a raw log record 144B that is of a first log record format and that stores in the specific set of fields 116A-E raw pieces of the data 145A-E that relate to an event that occurred in one of the set of applications. The tokenized log record generator 120, determines, based on the log record format being of a first of log record type, e.g., log record type 114B, that a first field, e.g., field 116E, from the raw log record is to be tokenized based on a first tokenization strategy ST 117A of a plurality of tokenization strategies in the first log record type. Each of the tokenization strategies identifies a tokenization mechanism from the tokenization mechanisms to be used for generating a token from a raw value to enable compliance with a respective set of regulations and requirements regarding privacy and the handling of data. Each one of the log records types specifies which one or more of the tokenization strategies to apply to one or more of the specific plurality of fields of one of the record formats.

The tokenized log record generator 120 generates for a first raw value 145E in the first field 145E of the raw log record 144B a first token (145E.A) that is an anonymized representation of the first raw value using a first tokenization mechanism 122A identified by the first tokenization strategy 117A in the log record type 114B. The tokenizer 110 outputs a tokenized log record generated based on the raw log record and the first token to be used by one or more of the of log record consumers. For example, the tokenizer 110 outputs the tokenized log record 144B.A and/or the tokenizer log record 144B.B respectively used by the use case 141A and the use case 141B.

The tokenized log record generator 120 may determine that one or more additional fields of the raw log record 144B are to be tokenized. For example, the tokenized log record generator 120 determines based on the log record format being of the log record type 114B that a second field 116D from the raw log record 144B is to be tokenized based on a second tokenization strategy ST 117C identified in the first log record type 114B that is different from the first tokenization strategy 117A used for tokenizing the field 116E. The tokenized log record generator 120 generates for a second raw value 145D in the second field 116D of the raw log record 144B a second token 145D.B that is an anonymized representation of the second raw value 145D using a second tokenization mechanism 122A identified by the second tokenization strategy in the log record type 114B, where the second tokenization mechanism is different from the first tokenization mechanism. The tokenizer 110 outputs the tokenized log record generated which is also based on the second token.

Figure 1B:
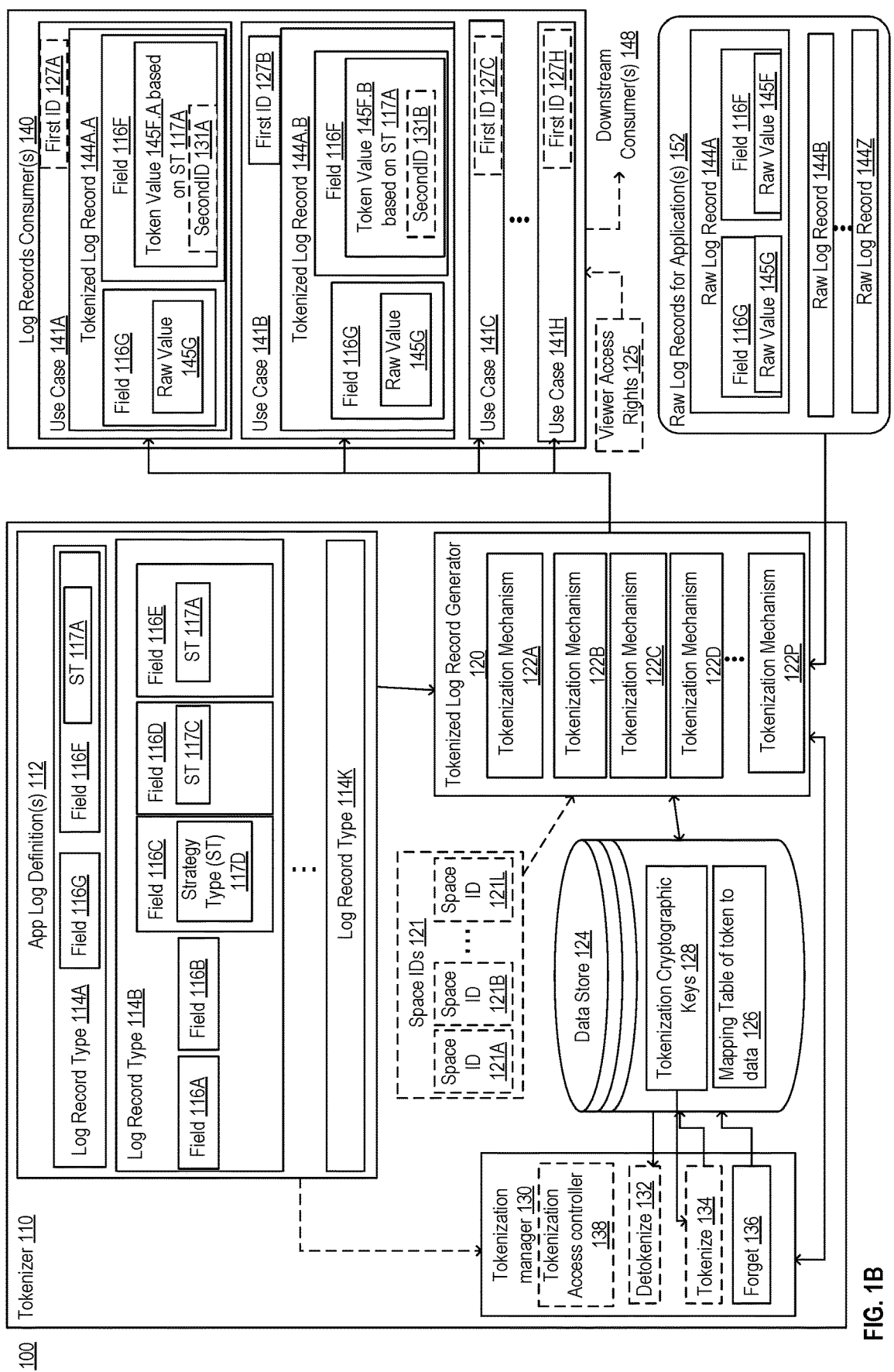
FIG. 1B illustrates a block diagram of a system for enabling multiple log record consumers to comply with regulations and requirements regarding privacy and handling of data when a second field is to be tokenized in a log record according to one implementation.

FIG. 1B illustrates a block diagram of a system 100 where a second raw log record 144A is processed at the tokenizer 110. The tokenizer 110 includes multiple log record types 114A-114K that identify log record formats that are different from one another. Each one of the formats has a specific set of fields that is different from the specific sets of fields of the other formats. For example, two formats may have a different number of fields. Alternatively, two formats may have the same number of fields but at least one field in a first format is of a different type than another field in the other format. Different log record types 114A-K identify different formats of log records. The tokenizer 110 receives a second raw log record 144A that is of a second log record format and that stores in a second specific set of fields (here field 116G and field 116F) second raw pieces, i.e., raw value 145G and raw value 145F, of the data that relate to a second event that occurred in a second one of the set of applications. The second log record format is different from the first log record format. The second log record format includes a different number of fields as well as fields of different types.

The tokenized log record generator 120 determines, based on the second log record format being of a second log record type 114A that is different from the first log record type 114B, that a second field, e.g., 116F from the second raw log record 144A is to be tokenized based on a second tokenization strategy ST 117A identified in the second log record type 114A. The tokenized log record generator 120 generates for a second raw value 145F in the second field 116F of the second raw log record 144B a second token that is an anonymized representation of the second raw value using a second tokenization mechanism 122A identified by the tokenization strategy ST117A in the second log record type 114A. In this example, while the log record types 114A and 114B are different, the tokenization mechanism used to tokenize the field 116F is the same as the tokenization mechanism used to tokenize the field 116E of log record type 114B. A second tokenized log record is output. The second tokenized log record is generated based on the second raw log record and the second token to be used by one or more of the plurality of log record consumers. For example, the tokenized log record 144A.A includes the token value 145F.A in field 116F instead of a raw value 145F to be used by the use case 141A.

The system 100 allows the log record consumers to manipulate data that may include sensitive data (such as personal data) in compliance with requirements and regulations related to privacy and data handling of personal data. In some implementations, each field of a given type (e.g., a user identifier, a name of a user, phone number, or other types of data) will be tokenized based on the same tokenization mechanism identified with the same tokenization strategy across all the log record types. This will allow a raw value of a given field to have a consistent tokenized value in multiple tokenized log records in use in a use case. Further, the tokenization mechanism is selected to tokenize the data in the field to ensure compliance with a respective set of regulations and requirements regarding privacy and the handling of personal data. For example, each tokenization mechanism ensures the compliance with different requirements. The requirements (and therefore the tokenization mechanisms) can vary based on the type of the log record consumers (e.g., log record consumers for troubleshooting vs security vs telemetry). Further the requirements can vary based on the type of data to be tokenized. For example, personal data may need to have a stricter set of regulations such that access to the raw data is more controlled and the raw data may not be stored for an extended amount of time in the system. In addition, the system needs to ensure that a request to forget the user will be addressed in a timely manner for personal data.

As will be described in further details below, the different tokenization mechanisms used allow for a different degree of support of right to be forgotten resulting in a request to be forgotten to be treated differently when received in the system depending on the type of tokenization of the token. The different tokenization mechanisms also allow for enabling a log record consumer to detokenize a token or not.

In some implementations, in addition to the tokenization mechanism identified in the log record type for a field, the tokenized log record generator 120 further performs the tokenization based on a space identifier. The tokenization approach can be built on having different tokens for a given raw values for multiple spaces. The separation between the multiple spaces reduces risk in the overall compliance even if some spaces are more prone to token/raw value leaks. Further, separate tokenization spaces allow for more granular control over data use, and granular decisions on whether to anonymize personal data at the request of a data subject.

In some implementations, the TLRG 120 may determine one from a set of space IDs 121 for which a token is to be generated for a raw value. In other implementations, the TLRG 120 may generate for a raw value a respective token in each one of the spaces identified with a space ID from space IDs 121. Each one of the spaces identified based on the space IDs 121 and has a specific set of characteristics defining how log record consumers access raw values in fields tokenized in the first space. For example, the space may determine whether a raw value is allowed to be obtained from a token, whether the RTBF is to be supported or not, etc. In addition, a token for a raw value generated in a given space is different from any other token value for the same raw value generated in any one of the other spaces.

The characteristics of a space (that is identified with a respective space ID) determines what a use case is allowed to see from a log record (what is raw vs tokenized), it may define a time period within which the use case can detokenize a tokenized field of a tokenized log record (e.g., the detokenization can be allowed for a time period, always allowed, always allowed prior to user requesting to be forgotten). In some implementations, the system 100 allows for two spaces or more to be defined: a first space which can be referred to as a general space and a second space which can be referred to as the restricted space. In other implementations, a different number of spaces can be defined.

Referring back to FIG. 1A and raw log record 144B, a first token value 145E.A is generated for the raw value 145E of the field 116E in a first space identified with space ID 121A and a second token 145E.B that is different from the first token 145E.A is generated in a second space identified with a second space ID 121B. The second token 145E.B is an anonymized representation of the first raw value 145E in the second space that has a second set of characteristics different from the first set of characteristics, and which define how log record consumers access raw values of tokenized log records. Thus, the use case 141A can access and view the raw values from the tokenized values differently than the use case 141B. For example, in one implementation, the first space allows for personal data of a user to be forgotten upon receipt of a request to forget the personal data and the second space does not allow for the personal data to be forgotten upon receipt of the request to forget the personal data.

Figure 1C:
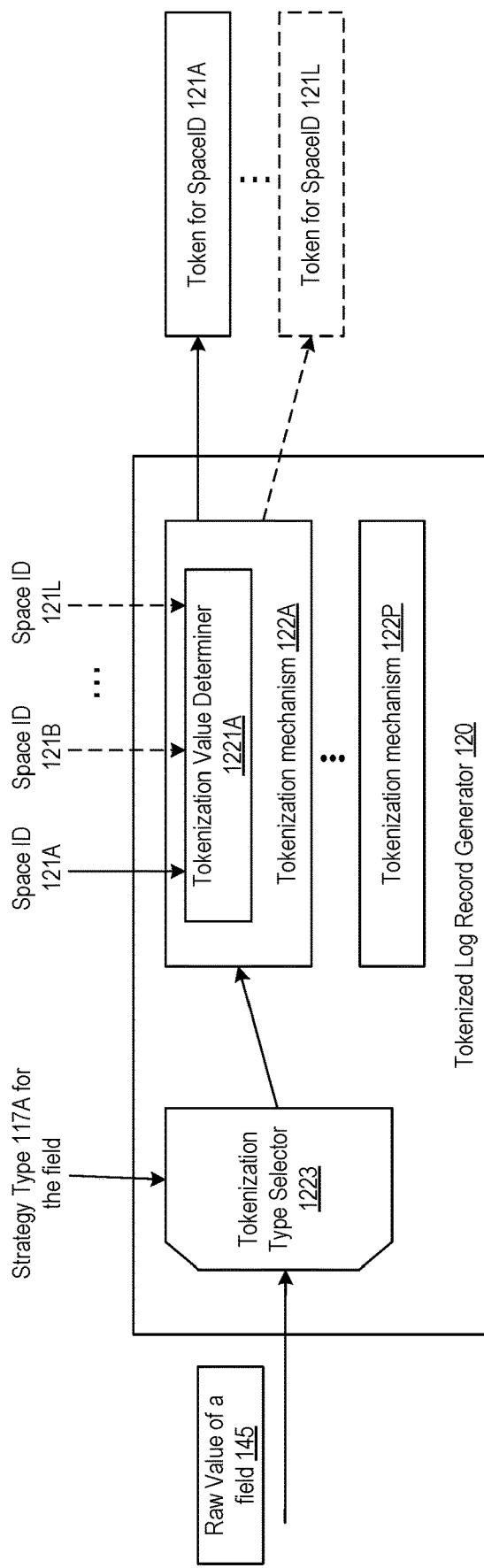
FIG. 1C illustrates a block diagram for tokenization of a raw value of a field based on a spaced ID identifying a space in accordance with some implementations.

In some implementations, the space ID can be used to select a tokenization value that is to be used for generating the token for a raw value of a field in the space identified with the space ID. FIG. 1C illustrates an exemplary block diagram for generation of tokens in multiple spaces according to one implementation. When a raw value 145 of a field is received, the tokenization type selector 1223 uses the tokenization type associated with the corresponding field (e.g., ST 117A) to select the proper tokenization mechanism to use for tokenizing the raw value. In the illustrated example, ST117A is used to select the tokenization mechanism 122A. The tokenization mechanism 122A uses one or more space IDs 121A-L to determine one or more spaces in which to tokenize the raw value. In some implementations, the space ID determines a tokenization value that is to be used when generating the token in a given space. As it will be described below with respect to multiple tokenization mechanisms, depending on the mechanism the tokenization value may be a different type of tokenization value. For example, when a one to one mapping tokenization mechanism is used, the space ID may determine a seed to a pseudo random generator that is to be used for generating the token value in that space. In another example, if the tokenization mechanism is an encryption mechanism, the tokenization value can be used to generate a key to be used in the encryption of the raw value. Different spaces will result in the determination of a different tokenization value to be used by a same tokenization mechanism allowing for the generation of different tokens for a same raw value. In some implementations, the tokenization mechanism may have access to all the space IDs and generates for each raw value all the tokens in all these spaces. In other implementations a subset of the space IDs is input (one or more) where the subset is less than the entire set of space IDs, and the tokenization mechanism generates tokens for the raw value in the respective subset of spaces as identified by the subset of space IDs.

In some implementations, the TLRG 120 generates a unified tokenized log record (e.g., unified tokenized log record 146C of FIG. 3A) based on the raw log record 144A, the first token defined in a first space, and the second token defined in a second space for the same raw value. The first token is to be used by a first one of the log record consumers use case 141E and the second token is to be used by a second one of the log record consumers 141F.

Figure 3A:
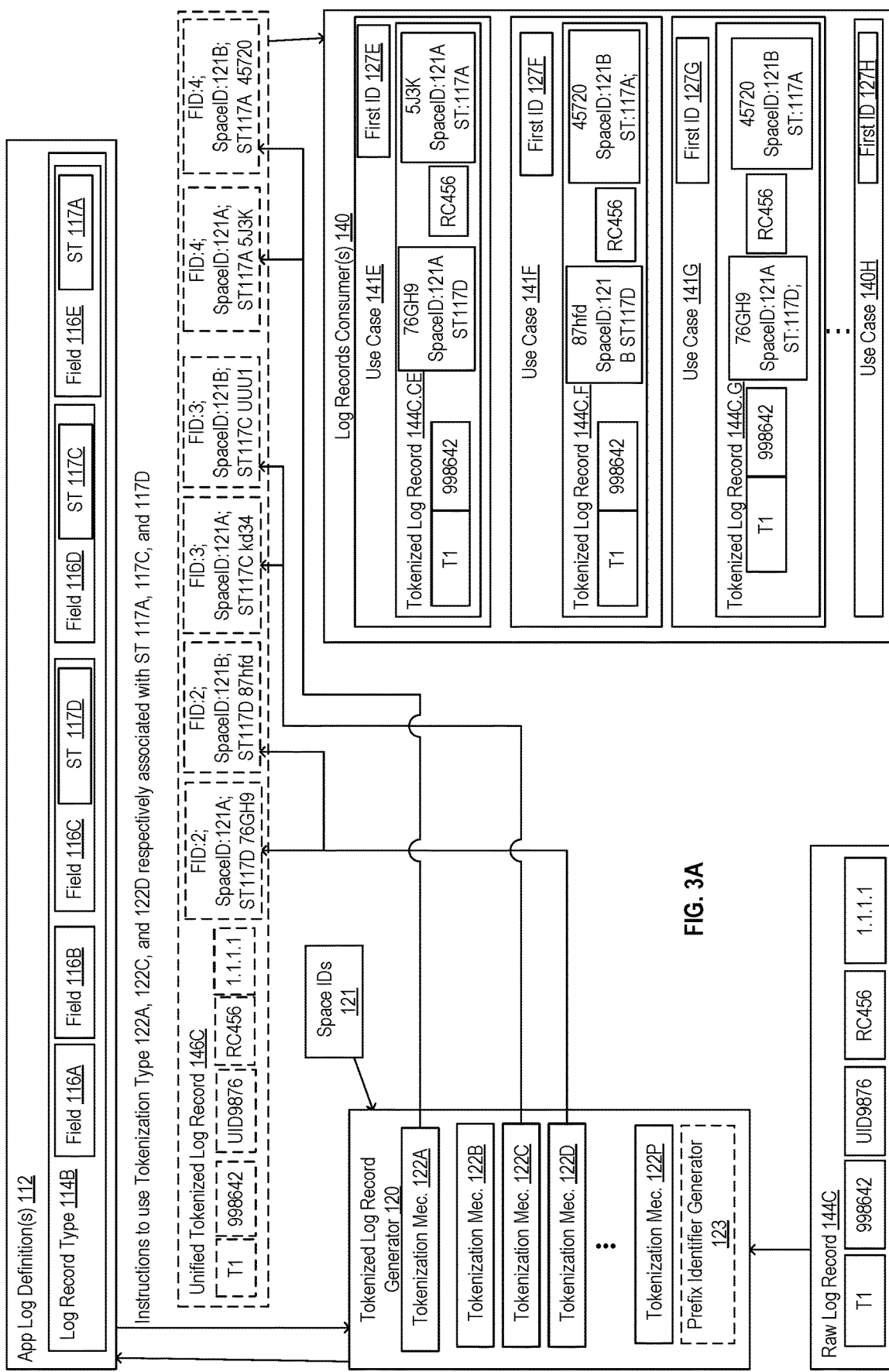
FIG. 3A illustrates an exemplary implementation where a raw log record is tokenized to produce a unified tokenized log record for multiple spaces and use cases in accordance with some implementations.

FIG. 3A illustrates an exemplary implementation where a raw log record is tokenized to produce a unified tokenized log record for multiple spaces and use cases. The raw log record 144C is tokenized by the TLRG 120 based on the log record type 114B and the space IDs 121. In the illustrated implementation, the space IDs 121 include two identifiers of two spaces space ID 121A and space ID 121B. In this implementation, each field is tokenized based on the corresponding ST that it is assigned (e.g., field 116C is assigned ST 117D corresponding to tokenization mechanism 122D, field 116D is assigned ST 117C corresponding to tokenization mechanism 122C, and field 116E is assigned ST 117A corresponding to tokenization mechanism 122A) for each one of the spaces that are defined in Space IDs 121. A unified tokenized log record 146C is generated including for each raw field that is to be tokenized multiple tokenized values. Each tokenized value being generated for a corresponding space. In some implementations, the unified tokenized log record includes the raw values of the fields in additions to all the tokens generated for all spaces. Each token is identified with the FID, field identifier, the Space ID, the Strategy ID ST, and the tokenized value. In some implementations, a unified tokenized log record may include for each raw value of a field that is to be tokenized tokens generated in a subset of the spaces that are available, where the subset is less than the entire set of the spaces.

The unified tokenized log record is received by the log consumers 140 and each use case 141E-H is to access and store a tokenized log record (e.g., 144C.E, 144C.F, 144C.G). Each one of the tokenized log records in a corresponding use case includes a tokenized value that is associated with the space as indicated by the first ID 127E-H.

In some implementations, the TLRG 120 may generate for each raw log record received multiple tokenized log records, one for each use case that is to receive the tokenized log record instead of a single unified tokenized log record.

FIG. 3B illustrates a block diagram of exemplary use of a policy for generation of tokenized log records in accordance with some implementations. The policy is defined based on a set of requirements and regulations that a use case is to comply with to process, use, or store log records generated by one or more applications. The compliance to the policy is enabled through a combination of selection of a tokenization mechanism for a field that is to be tokenized, the determination of the log records that can be received by a use case, a space in which the field values are to be tokenized. While an exemplary general process of the system 100 is illustrated with respect to the raw log record 144C, different log records can be processed in the system 100 without departing from the scope of the implementations described herein.

The log record 144C is tokenized by the TLRG 120 based on the log record type 114B that is stored in the app log definition 112. In some implementations, a unified tokenized log record 146C is generated as a result of the operation performed in the TLRG 120 and is consumed by the log record consumers 140 based on the viewer access rights 125. In other implementations, tokenized log records are generated for each one of the use cases without having a unified tokenized log record based on the log record types and the viewer access rights 125.

In the illustrated example of FIG. 3B, each use case 141F and 141E uses a tokenized log record 144C.F and 144C.E that is determined based on the respective viewer access right 125A and 125B, and that is identified in the first ID 127F (e.g., VAR 125A) and 127G (e.g., VAR 125B) respectively. The use cases 141F and 141E may store or process the tokenized log record to achieve various goals (e.g., data analytics, security, compliance, debugging, etc.). Each one of the viewer access right 125A and 125B determines for a given user of the use case 141F and 141G the access to the tokenized log records. The user can be an actual person using the use cases, a group defined in the use case, or alternatively the use case itself. The user can be associated with login credentials that can be used by the viewer access authorizer 1251A or 1251B. When the user is the use case itself, the viewer access right may determine the rights for the use case to store the tokenized log records. Further the viewer access rights 125A and 125B identify for the respective use case the log records that it is to receive for processing or storage.

In addition, in one implementation, for each field of the log record in the viewer access right 125-U, a space ID is identified indicating in which space the tokenized field is to be accessed. In this implementation, two or more fields in a record type can be associated with a same spaceID. For example, the use case 141F is operative to access the tokenized log record 144C.F where the third field of the log record and the last field of the log record are tokenized in the same space identified by space ID 121A. Alternatively, at least two fields in a record type can be associated with different space IDs. The use case 141G is operative to access the tokenized log record 144C.G where the third field of the log record is tokenized in a first space identified by a first space ID 121A and the last field of the log record is tokenized in a second space identified by space ID 121B.

In another implementation, the use case is operative to have all tokenized log records expressed in a single space as indicated in the first ID 127 that would include an identifier of the space. In this implementation, there is no need for the respective viewer access right 125 of the use case to include for each field of a log record the space ID in which it is tokenized.

FIG. 3B shows that the system 100 enables a flexible definition of a policy for each use case from the use cases 141 in the log record consumers 140. This enables each use case to comply with a particular set of regulations and requirements regarding the handling of data and privacy that are different from the other use cases. The compliance takes into consideration the type of data that is to be tokenized (by selecting a proper tokenization mechanism for the particular type of data) and that adequate support for RTBF, detokenization, tokenization of data is enabled. The policy further ensures that each use case only receives the tokenized log records needed as opposed to receiving all log records generated for the applications.

The operations in the flow diagrams of FIGS. 4-5 will be described with reference to the exemplary embodiments of the FIGS. 1A-3B. However, it should be understood that the operations of the flow diagrams can be performed by embodiments of the invention other than those discussed with reference to these other figures, and the embodiments of the invention discussed with reference to these other figures can perform operations different than those discussed with reference to the flow diagrams.

Figure 4:
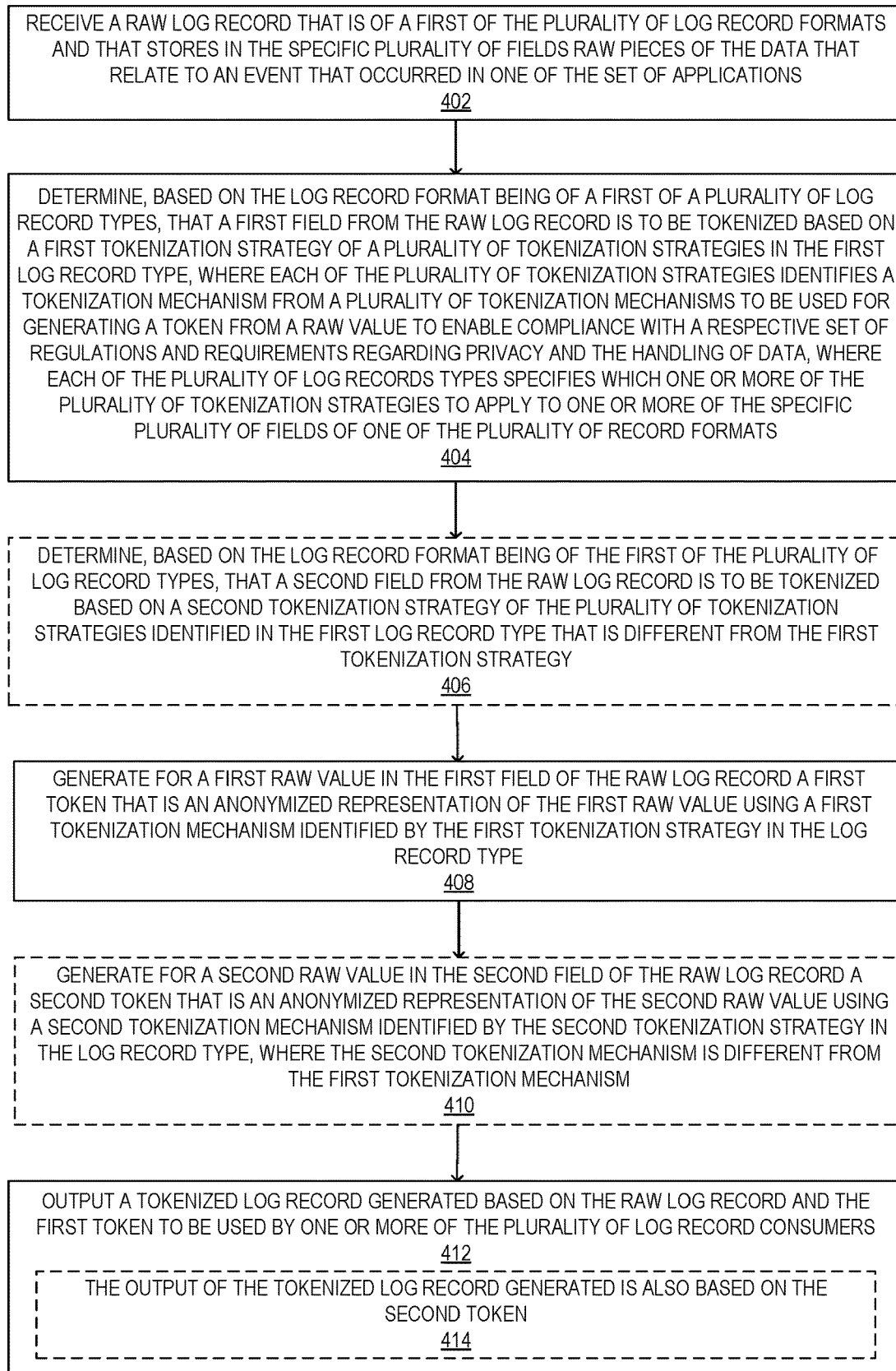
FIG. 4 illustrates a flow diagram of exemplary operations for enabling log record consumers to comply with regulations and requirements regarding privacy and handling of data in accordance with some implementations.

FIG. 4 illustrates a flow diagram of exemplary operations for enabling log record consumers to comply with regulations and requirements regarding privacy and handling of data in accordance with some implementations. A set of applications (not illustrated) that have access to data generate raw log records (e.g., raw log records 152) responsive to events that occur in the set of applications. Each one of the raw log records stores pieces of the data, e.g., the raw values 145A-E of the fields 116A-E, that relate to an event that occurs in the set of applications. Each one of the raw log records, e.g., raw log record 144B is of one of multiple log record formats identified by a log record type (e.g., log record types 144A-K), where each of the record formats includes a specific set of fields for storing different pieces of the data to which the set of applications have access.

At operation 402, the tokenizer 110, receives a raw log record (e.g., raw log record 144B) that is of a first log record format and that stores in the specific set of fields (e.g., fields 116A-E) raw pieces of the data (145A-E) that relate to an event that occurred in one of the set of applications. At operation 404, the tokenized log record generator 120, determines, based on the log record format being of a first of log record type, e.g., log record type 114B, that a first field, e.g., field 116E, from the raw log record is to be tokenized based on a first tokenization strategy ST 117A of a plurality of tokenization strategies in the first log record type. Each of the tokenization strategies identifies a tokenization mechanism from the tokenization mechanisms to be used for generating a token from a raw value to enable compliance with a respective set of regulations and requirements regarding privacy and the handling of data. Each one of the log records types specifies which one or more of the tokenization strategies to apply to one or more of the specific plurality of fields of one of the record formats.

At operation 408, the tokenized log record generator 120 generates for a first raw value 145E in the first field 145E of the raw log record 144B a first token (145E.A) that is an anonymized representation of the first raw value using a first tokenization mechanism 122A identified by the first tokenization strategy 117A in the log record type 114B. At operation 412, the tokenizer 110 outputs a tokenized log record generated based on the raw log record and the first token to be used by one or more of the of log record consumers. For example, the tokenizer 110 outputs the tokenized log record 144B.A and/or the tokenizer log record 144B.B respectively used by the use case 141A and the use case 141B.

In some implementations, the tokenized log record generator 120 may determine that one or more additional fields of the raw log record 144B are to be tokenized. For example, the tokenized log record generator 120, may determine, at operation 406, based on the log record format being of the log record type 114B that a second field 116D from the raw log record 144B is to be tokenized based on a second tokenization strategy ST 117C identified in the first log record type 114B that is different from the first tokenization strategy 117A used for tokenizing the field 116E. At operation 410, the tokenized log record generator 120 generates for a second raw value 145D in the second field 116D of the raw log record 144B a second token 145D.B that is an anonymized representation of the second raw value 145D using a second tokenization mechanism 122A identified by the second tokenization strategy in the log record type 114B, where the second tokenization mechanism is different from the first tokenization mechanism. At operation 414, the tokenizer 110 outputs the tokenized log record which is generated also based on the second token.

The raw log records to be tokenized can be of different log record formats identified by a variety of log record types that are different from one another. Each one of the formats has a specific set of fields that is different from the specific sets of fields of the other formats. For example, two formats may have a different number of fields. Alternatively, two formats may have the same number of fields but at least one field in a first format is of a different type than another field in the other format. For example, different log record types 114A-K identify different formats of log records. FIG. 5 illustrates a flow diagram of exemplary operations for enabling multiple log record consumers to comply with regulations and requirements regarding privacy and handling of data when a second raw log record is to be tokenized according to one implementation.

At operation 502, the tokenizer 110 receives a second raw log record (e.g., 144A) that is of a second log record format and that stores in a second specific set of fields (here field 116G and field 116F) second raw pieces, e.g., raw value 145G and raw value 145F, of the data that relate to a second event that occurred in a second one of the set of applications. The second log record format is different from the first log record format. The second log record format includes a different number of fields as well as fields of different types.

At operation 504, the tokenized log record generator 120 determines, based on the second log record format being of a second log record type (e.g., type 114A) that is different from the first log record type (e.g., 114B), that a second field, e.g., 116F, from the second raw log record is to be tokenized based on a second tokenization strategy, e.g., ST 117A, identified in the second log record type. At operation 504, the tokenized log record generator 120 generates for a second raw value, e.g., 145F, in the second field of the second raw log record a second token that is an anonymized representation of the second raw value using a second tokenization mechanism, e.g., 122A, identified by the tokenization strategy in the second log record type. In this example, while the log record types 114A and 114B are different, the tokenization mechanism used to tokenize the field 116F is the same as the tokenization mechanism used to tokenize the field 116E of log record type 114B. A second tokenized log record is output at operation 508. The second tokenized log record is generated based on the second raw log record and the second token to be used by one or more of the plurality of log record consumers. For example, the tokenized log record 144A.A includes the token value 145F.A in field 116F instead of a raw value 145F.B to be used by the use case 141A.

The system 100 allows the log record consumers to manipulate data that may include sensitive data (such as personal data) in compliance with requirements and regulations related to privacy and data handling of personal data. The present implementations present several advantages with respect to the prior approaches in which data was ingested or accessed without taking into consideration the different regulations and requirements that use cases may need to comply to. The system described herein allows for flexibility of implementation and adaptation to different use cases that may differing sets of requirements and regulations to which they need to comply with. In some implementations, each field of a given type (e.g., a user identifier, a name of a user, phone number, or other types of data) will be tokenized based on the same tokenization mechanism identified with the same tokenization strategy across all the log record types. This allows a raw value of a given field to have a consistent tokenized value in multiple tokenized log records in use in a use case. Further, the tokenization mechanism is selected to tokenize the data in the field to ensure compliance with a respective set of regulations and requirements regarding privacy and the handling of personal data. For example, each tokenization mechanism ensures the compliance with different requirements. The requirements (and therefore the tokenization mechanisms) can vary based on the type of the log record consumers (e.g., log record consumers for troubleshooting vs security vs telemetry). Further the requirements can vary based on the type of data to be tokenized. For example, personal data may need to have a stricter set of regulations such that access to the raw data is more controlled and the raw data may not be stored for an extended amount of time in the system. In addition, the system needs to ensure that a request to forget the user will be addressed in a timely manner for personal data.

As will be described in further details below, the different tokenization mechanisms used allow for a different degree of support of right to be forgotten resulting in a request to be forgotten to be treated differently when received in the system depending on the type of tokenization of the token. The different tokenization mechanisms also allow for enabling a log record consumer to detokenize a token or not.

In addition, in some implementations, the system allows for a given value to be tokenized based on a single tokenization mechanism and based on one or more spaces. This enables the tokenized log records to have different level of RTBF support as well as different access and viewing support for the different use cases accessing the data.

Tokenization Mechanisms:
One to One Mapping Tokenization:
Several tokenization mechanisms can be used without departing from the scope of the different implementations of the system 100. For example, a one to one mapping tokenization (which can also be referred to as userID tokenization strategy) can be used as one of the tokenization mechanisms 122A-P. One to one mapping tokenization is implemented by persisting a randomly generated token to a storage (e.g., Oracle database table) for a raw value of a field to which the tokenization is to be applied. For example, when a raw value of the field is an organization identifier and user identifier pair, the one to one mapping tokenization can be used to generate a random token for the pair organization/user identifiers and store the mapping token to raw value in a storage table. When the system receives a request to forget a user (e.g., when a user requests that any data related to their identity and their activity be forgotten (not accessible anymore, not recoverable) or another entity requests that the user's data be forgotten in the system) the mapping between the token and the raw data is deleted from the storage table.

Figure 2A:
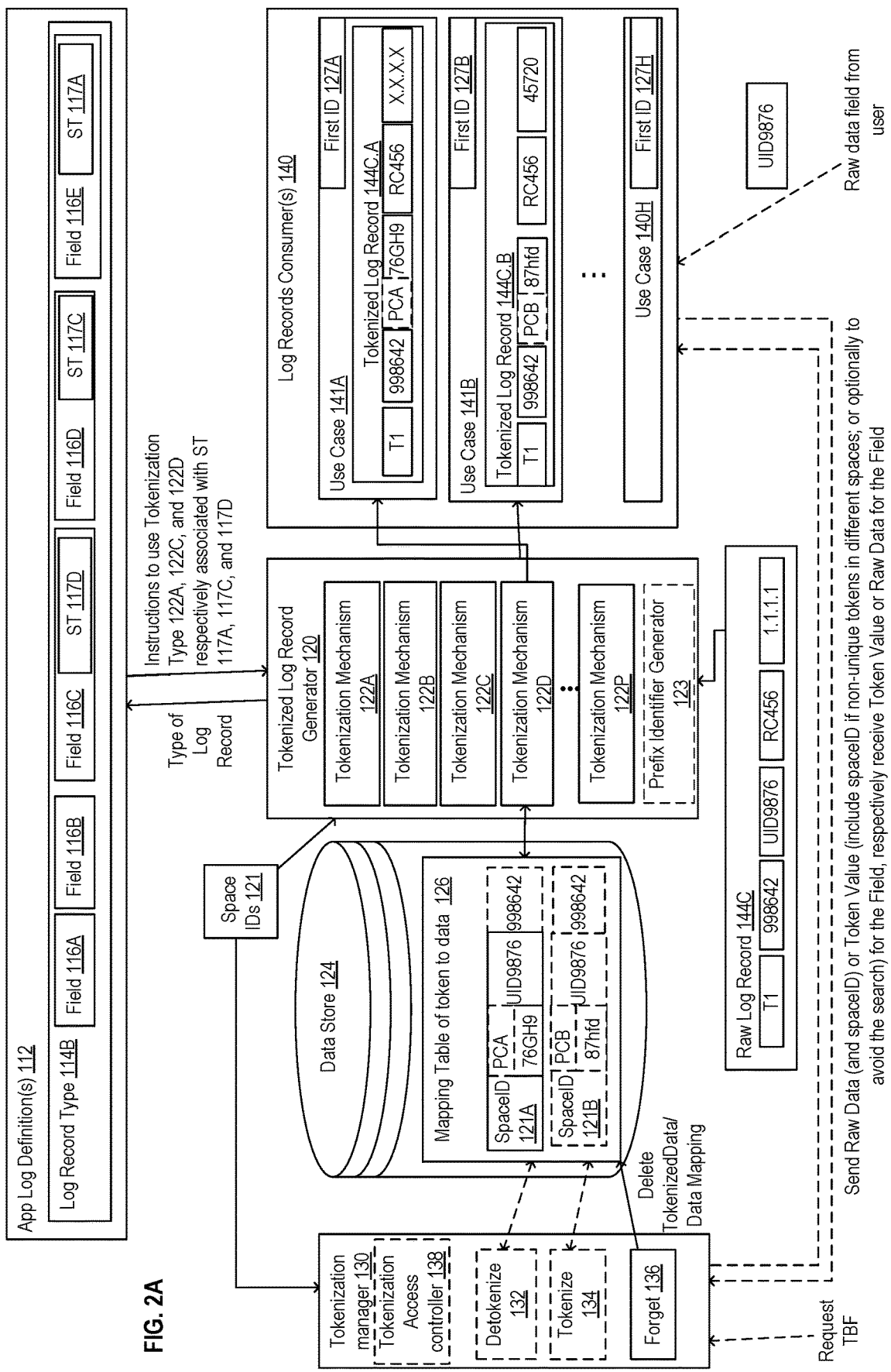
FIG. 2A illustrates a block diagram of an exemplary implementation where a field in a raw log record is to be tokenized based on a one to one mapping tokenization in accordance with one implementation.

FIG. 2A illustrates a block diagram of an exemplary implementation where a field in a raw log record is to be tokenized based on a one to one mapping tokenization in accordance with one implementation. The raw log record 144C is received. The TLRG 120 determines the type of log record of the raw log record 144C, accesses the app log definition(s) 112 to determine that the fields 116C, field 116D, and the field 116E are to be tokenized based on a first ST 117D, a second ST 117C, and a third ST 117A respectively. The use case 141A is associated with a first ID 127A. In one example, the use case 141A is defined in a first space by assigning space ID 121A to the first ID 127A. In this example, the fields of the tokenized log record 144C.A used by the use case 141A are represented in the space identified by the space ID 121A. Other examples of values can be assigned to the first ID 127A. For example, the first ID 127A can include a viewer access right ID, in which case each field of the tokenized log record 144C.A would be further determined based on a space ID defined for the particular field. The use case 141B is associated with a first ID 127B. In one example, the use case 141B is defined in a second space (that is different from the first space) by assigning a space ID 121B to the first ID 127B. In this example, the fields of the tokenized log record 144C.B used by the use case 141B are represented in the space identified by the space ID 121B. Other examples of values can be assigned to the first ID 127B. For example, the first ID 127B can include a policy ID, in which case each field of the tokenized log record 144C.B would be further determined based on a space ID defined for the particular field.

The TLRG 120 determines that the field 116C is to be tokenized based on 122D as indicated by the attribute's value in ST 117D. In one exemplary implementation, tokenization type 122D is referred to as a one to one mapping tokenization. According to ST 117D a mapping between the tokenized value of the field 116C from the raw log record 144C and the raw value for that field (here UID9876) is stored. The mapping is stored in a mapping table of token to data 126 in the data store 124 and is accessible to tokenize 134, detokenize 132, as well as forget 136 operations of the tokenization manager 130.

In some implementations, a one to one mapping tokenization approach is built on having different token mappings per spaces. The separation reduces risk in overall compliance even if some spaces are more prone to token mapping leaks. Further, separate tokenization spaces allow for more granular control over data use, and granular decisions on whether to anonymize personal data at the request of a data subject.

In these implementations, the field is tokenized in multiple spaces such that for each raw value a token value is generated for each space from the multiple spaces. For example, for the raw value "UID9876" of raw log record 144C, a first tokenized value "76GH9" is generated in a first space with SpaceID 121A, and a second tokenized value is generated "877hfd" in a second space SpaceID 121B. The first token value is different than the second token value. In some implementations, per-Space tokenization means the same field may be represented by a different tokens in each space (as illustrated with the example of field 116C and space ID 121A and spaceID 121B in FIG. 2A). In one example, there is no mechanism to link tokens between two spaces, without having lookup access for both spaces. While the illustrated example of FIG. 2A shows a mapping table where two mapping for the same field value/token for two different spaces 121A and 121B are stored, in other implementations, different mapping tables can be used to store separate mappings per space. A mapping table for each space is stored separately from the other table.

Each space identified by a space ID is associated with a set of characteristics that define how a use case 141A-H can access or modify the raw data of the tokenized log record. For example, the characteristics of a space (that is identified with a respective space ID) determines what a use case is allowed to see from a log record (what is raw vs tokenized), it may define a time period within which the use case can detokenize a tokenized field of a tokenized log record (e.g., the detokenization can be allowed for a time period, always allowed, always allowed prior to user requesting to be forgotten). In some implementations, the system allows for two spaces or more to be defined: a first space referred to as a restricted space and a second space referred to as the general space. In other implementations, a different number of spaces can be defined.

In one non-limiting implementation, the general space can be a space in which right to be forgotten is supported and the restricted space can be a space in which the right to be forgotten is not supported. When the right to be forgotten is supported, the process of forgetting user data can be performed. Forgetting a user is the process of forgetting any data related to the user and the user's activity by making it inaccessible (i.e., deleting the data or making the data completely anonymized such that the identity of the user or information about activity of the user cannot be retrieved from tokenized data) upon receipt of a request to forget the user. The request can be from the user or from another entity. Some regulations and requirements regarding privacy and the handling of sensitive data set a time limit after which a request to be forgotten must be complied with. While some implementations may comply with a request to be forgotten relatively quickly, and thus well within this time limit; alternative implementations may comply more slowly (e.g., closer to end of such a time limit). In fact, within a single implementation this may vary based upon the tokenization strategies. Alternatively, when the right to be forgotten is not supported, a request to forget a user is not granted and does not result in the anonymization or deletion of the data related to the user's identity or the user's activity in the system. In a space that does not support the right to be forgotten, the data is kept or processed regardless of the receipt of a request to forget a user. In some implementations access to such a space can be restricted to a limited number of users and may have stringent access authorization than a general type space where RTBF is supported. In some implementations a restricted space can be accessible to a small set of users for a given set of business reasons that still comply with regulations and requirements regarding handling of personal data and privacy.

Referring to FIG. 2A, in some implementations, in addition to storing the tokenized value for a field, an entry of the mapping table 126 also include a Prefix identifier that is to be assigned to the tokenized value. The prefix identifier is generated by the prefix identifier generator 123. For example, in the mapping table 126, the tokenized value "76GH9" of raw data field "UID9876" is associated with a prefix identifier PCA for the space ID 121A; and the tokenized value "87hfd" of raw data field "UID9876" is associated with a prefix identifier PCB for the space ID 121B. In some implementations, the prefix identifier includes at least one of the following: an identifier of the strategy mechanism used to tokenize the field, the identifier of the space in which the field is tokenized, an optional identifier of a cryptographic key used to tokenize the field, an optional initialization vector used for generated the tokenized value of the field, and other information related to the tokenization of the field. In a non-limiting example, the prefix identifier PCA can indicate that ST 117D and space 121A were used when tokenizing the value of field 116C for the raw log record 144C. In another non-limiting example, the prefix identifier PCB can indicate that ST 117D and space 121B were used when tokenizing the value of field 116C for the raw log record 144C. While some implementations are illustrated with a tokenized value associated with a prefix identifier, in other implementations, the additional information (e.g., space ID, strategy type, identifier of cryptographic key, initialization vector, etc.) associated with the tokenization of the field can be stored as metadata in other forms. For example, the additional information can be stored in a new field of the tokenized log record, a new field part of the mapping table 126 that is different from the token field.

In some implementations, the mapping tokenized value/raw value is obtained by the tokenization mechanism 122D generating the tokenized value for the raw value. In one exemplary mechanism, the tokenized value is generated by a random number generator that generates a random value for the raw value field. In some implementations, the random number generator may take as an input a seed value and generate the random value for the raw value field. In some implementations, the seed value may be determined based on the space in which the token is to be generated such that a seed value for a first space is different from the seed values of all the other spaces. This results in obtaining different random value for the same raw value in the different spaces. The tokenized log record 144C.A is obtained by the use case 141A. The tokenized log record includes raw fields as well as a tokenized value 76GH9 of the UID9876 field 116C. This value is obtained by a randomization of the value of the field UID9876 and is stored in the mapping table 126 as a mapping of token and data for a space 121A. In some implementations, the tokenized log record 144C.A is received from the tokenized log record generator 120 as is. In other implementations, the tokenized log record 144C.A is obtained by the use case 141A following a filtering operation that is performed on a unified tokenized log record as it will be described in further details below.

The tokenized log record 144C.B is obtained by the use case 141B. The tokenized log record includes raw fields as well as a tokenized value 87hfd of the UID9876 field 116C. This value is obtained by a randomization of the value of the field UID9876 and is stored in the mapping table 126 as a mapping of token and data for a space 121B. In some implementations, the tokenized log record 144C.B is received from the tokenized log record generator 120 as is. In other implementations, the tokenized log record 144C.B is obtained by the use case 141B following a filtering operation that is performed on a unified tokenized log record as it will be described in further details below.

In an implementation where the first ID 127A of the use case 141A includes space ID 121A, all the fields of the tokenized log record 144C.A are presented in the first space identified with space ID 121A. In an implementation where the first ID 127B of the use case 141B includes space ID 121B, all the fields of the tokenized log record 144C.B are presented in the second space identified with space ID 121B. The second space (space ID 121B) is different from the first space (space ID 121A). Other use cases can be defined where the first ID includes a policy ID and each field of a tokenized log record can be associated with a space ID such that two fields of the same tokenized log record for a use case can be represented in different spaces identified with different space IDs.

In this example, the tokenization manager 130 enables users of the system to access the mapping table of token to data 126 when proper access rights have been granted to a user to tokenize 134, detokenize 132, or forget 136 the data. The tokenization access controller 138 determines authorization of access to perform the operations 132, 134, or 136 based on one or more of the identification of the user attempting to perform the operation (e.g., the user can be a user of the log consumers, a use case, a log consumer, a user that is the owner of the personal data, etc.), the space ID in which the token was generated, and the strategy type with which the token was generated. In additional or alternative implementations, the access authorization can further be based on the type of log record, the field that is to be accessed, the use case attempting the access, a time at which the access is attempted. When the access is authorized, key or raw data is sent to consumers depending on authorization levels for the consumer.

In the example of FIG. 2A, when a forget data is requested (Request to be forgotten (RTB)), the tokenization manager 130 determines, through the tokenization access controller 138, whether the requestor is authorized to perform the operation, and upon determination that authorization is granted deletes, through the forget 136, the mapping of the tokenized value with the raw value for the given space. In some implementations, the requestor may request that all instances of the data be deleted in all spaces, and the forget 136 deletes all the instances in the mapping table (e.g., space ID 121A "76GH9" UID9876, and space ID 121B"87hfd" UID9876 are deleted). This renders all logs present in the log record consumers for the particular UID9876 completely anonymized and no access to this data based on the UID9876 can be made.

In alternative implementations, when space 121A is a general space that supports RTBF and the space 121B is a restricted space that does not support RTBF, upon receipt of a request to forget the user, the tokenization manager 130 causes the deletion of the mapping of the tokenized value with the raw value for space 121A and does not allow for the deletion of the mapping of the token value with the raw value for space 121B. This renders all logs present in the log record consumers for the particular UID9876 completely anonymized when the particular raw value is tokenized in the general space 121A and no access to this data based on the UID9876 can be made. Alternatively, the raw value of UID9876 in space 121B remains detokenizable and accessible through its token value "87hfd" in space ID 121B).

The tokenization manager 130 further enables a requestor to tokenize 134 or detokenize 132 values based on the mapping table 126. In one example, a use case may obtain the raw data field (e.g., UID9876) from the user and transmits the raw data field to the tokenization manager 130 to obtain the token value based on the tokenize 134. In some implementations, the use case may transmit in addition to the raw data the space ID in which the raw data has been tokenized. In another example, the use case may transmit the token value to the tokenization manager 130 to obtain raw data field by performing the detokenize 132. In some implementations, the token value includes the tokenized value and the space ID in which the raw data has been tokenized. In some implementations the space ID is identified in the prefix identifier. In other implementations, the token value includes the tokenized value without including the space ID. For example, the tokenized value can be unique over all spaces defined and therefore the tokenization manager 130 may not need to receive a space ID for retrieving the raw data associated with the tokenized value. In both cases, once the raw data field to token mapping is known the use case may preform searches or other operations on the tokenized logs as desired. The use case is allowed access to the data at the tokenization manager 130 based on whether or not the access can be authorized as described above. In some implementations, the token value that is sent to the tokenization manager 130 may include the tokenized value. In other implementations, the token value that is sent to the tokenization manager 130 may include the tokenized value and metadata associated with the tokenized value the meta data can include at least one of the following: an identifier of the strategy type used to tokenize the field, the identifier of the space in which the field is tokenized, an optional identifier of a cryptographic key used to tokenize the field, an optional initialization vector used for generated the tokenized value of the field, and other information related to the tokenization of the field.

In the example illustrated in FIG. 2A, a raw log record 144C is tokenized as a first tokenized log record 144C.A and a second tokenized log record 144C.B. Each of the tokenized log record 144C.A and 144C.B includes raw fields and tokenized fields. In this example, while the log record type 114B identifies strategy types for three fields (field 116C, 116D, and 116E) only a subset of these fields is tokenized. Thus, each use case 141A-H may determine fields that are to be tokenized and other that are to be kept raw. In some implementations, the determination on which fields are to be tokenized in which space can be performed based on the first ID 127A when the first ID indicates an identifier of a policy.

In one implementation, the example of use case 141A and tokenized log record 144C.A illustrate an exemplary tokenization mechanism performed based on a persistent random mapping, where the raw value of a field (field 116C) is mapped to a random value generated for the field and stored in the mapping table 126. The right to be forgotten is enforced by deleting the mapping of the tokenized value/ data in the mapping table 126. In some implementations, the RTBF is enabled at the tokenization manager 130 based on the space ID associated with the tokenized value.

In one implementation, the example of use case 141B and tokenized log record 144C.B illustrates an exemplary tokenization mechanism performed based on a persistent random mapping where a right to be forgotten is not enabled. In this example, the raw value of a field (field 116C) is mapped to a random value generated for the field and stored in the mapping table 126 for a second space (space ID 121B) that is different from the first space (space ID 121A). The right to be forgotten is disabled for this space. In this example, upon receipt of a request TBF, the tokenization manager 130 determines that the data has been tokenized in space ID 121B, for which RTBF is not enabled and the request is not granted.

In the illustrated example tokenized log record 144C.A and 144C.B includes a raw value for field 116D and a tokenized value for field 116E. The operation performed for obtaining the tokenized value for field 116E will be described in further details with respect to FIGS. 2B-D.

Figure 2B:
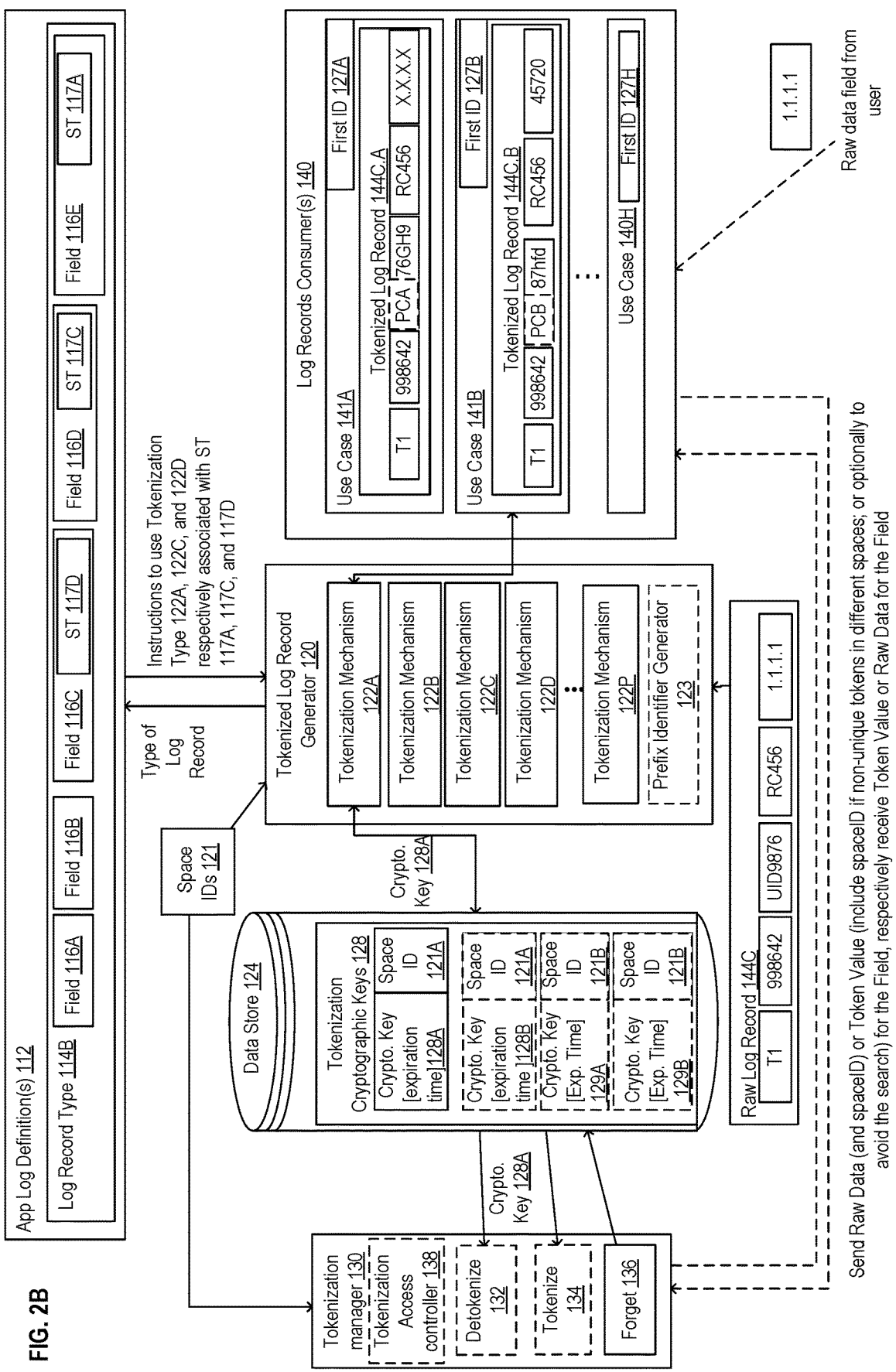
FIG. 2B illustrates a block diagram of an exemplary tokenization mechanism according to another implementation.

Cryptographic Tokenization:

FIG. 2B illustrates an exemplary tokenization mechanism according to another implementation. The tokenization mechanism is based on symmetric key encryption technique where a field is encrypted based on tokenization cryptographic keys 128. In these implementations the field value is tokenized based on the tokenization mechanism 122A corresponding to ST 117A as identified in the field 116E. In some implementations the keys 128 to be used for encrypting the raw data or decrypting the tokenized data is stored in the data store 124. Alternatively, the keys can be stored in the tokenization mechanism 122A. In some implementation for each space identified with a space ID 121, there are one or more keys that can be used for tokenization or detokenization.

In some of these implementations, each key can be associated with a corresponding expiration time period after which the key is no longer valid (e.g., the key can be deleted). For example, in some implementations different keys can be used for different spaces. For example, keys 128A-B can be used for space 121A, while keys 129A-B can be used for space 121B. Each of the keys 128A-B is associated with a different time for the space 121A. Each of the keys 129A-B is associated with a different time for the space 121B. Another implementation of tokenization mechanism is Long Term encryption tokenization. Long term encryption tokenization is a tokenization mechanism implemented using symmetric key encryption with a stable key (which does not expire). In some implementations, separate keys are generated for different spaces (for e.g., general and restricted space). In this implementation, the tokenization cryptographic keys 128 include long term cryptographic keys that are not associated with an expiration time. In some implementations, a different long term key can be defined for each space from the space IDs 121. For example, cryptographic key 128A is defined for space ID 121A, and cryptographic key 129A is defined for space ID 121B.

FIG. 2B illustrates an exemplary tokenization of field 116E for the use case 141B based on the tokenization type 117C defined in the app log definition 112 for this field. Similar operations as the one described with reference to the other figures can be performed for the other fields of the raw log records. The value of the field 116E of the raw log record 144C is tokenized as value "45720" based on the tokenization mechanism 122A. The tokenization mechanism 122A is performed as an encryption of the raw value based on a cryptographic key (e.g., key 129A). In one implementation, the selection of the key is determined based on the space ID that is associated with the field 116E for the use case 141B. In one implementation, the space ID can be identified in the First ID 127B. In another implementation, the space ID can be identified for the particular field based on a policy defined for the use case 141B, where the policy ID is included in the first ID 127B. In some implementations, the space ID is space ID 121B of the second space.

The tokenization manager 130 enables users of the system to access the keys 128 when proper access rights have been granted to the user to tokenize 134 or detokenize 132. The tokenization access controller 138 determines authorization of access to perform the operations 132, 134, or 136 based on one or more of the identification of the user attempting to perform the operation (e.g., the user can be a user of the log consumers, a use case, a log consumer, a user that is the owner of the personal data, etc.), the space ID in which the token was generated, and the strategy type identifying the tokenization mechanism with which the token was generated. In additional or alternative implementations, the access authorization can further be based on the type of log record, the field that is to be accessed, the use case attempting the access, a time at which the access is attempted. When the access is authorized, key or raw data is sent to consumers depending on authorization levels for the consumer.

In the example of FIG. 2B, when a forget user data is requested, the tokenization manager 130 determines, through the tokenization access controller 138, whether the requestor is authorized to perform the operation, and upon determination that the space ID is the ID of the second space (e.g., space ID 121B) authorization is not granted.

The tokenization manager 130 further enables a requestor to tokenize 134 or detokenize 132 values based on the keys 128. In one example, a use case may obtain the raw data field (e.g., 1.1.1.1) from the user and transmits the raw data field to the tokenization manager 130 to obtain the token value based on the tokenize 134 (encrypting the raw data based on the key 129A). In some implementations, the use case may transmit in addition to the raw data the space ID in which the raw data has been tokenized. In another example, the use case may transmit the token value to the tokenization manager 130 to obtain raw data field by performing the detokenize 132 (decrypting based on the key 129A for space ID 128B). In some implementations, the token value includes the tokenized value and the space ID in which the raw data has been tokenized. In some implementations the space ID is identified in the prefix identifier. In other implementations, the token value includes the tokenized value without including the space ID. In both cases, once the raw data field to token mapping is known the use case may preform searches or other operations on the tokenized logs as desired to obtain insight on the data associated with the field 116E. In some implementations, the token value that is sent to the tokenization manager 130 may include the tokenized value. In other implementations, the token value that is sent to the tokenization manager 130 may include the tokenized value and metadata associated with the tokenized value the meta data can include at least one of the following: an identifier of the strategy type identifying the tokenization mechanism used to tokenize the field, the identifier of the space in which the field is tokenized, an optional identifier of a cryptographic key used to tokenize the field, an optional initialization vector used for generated the tokenized value of the field, and other information related to the tokenization of the field.

Time Window Encryption Tokenization:

The following implementations describe tokenization of fields of log records using a key that has an expiration time for enabling temporary detokenization of tokenized data and compliance with regulations and requirements regarding privacy and the handling of personal data in a system that handles log records resulting from operations of one or more application.

The key is no longer available (e.g., either deleted or expires) for detokenizing data after the time expires. This allows the data to be automatically inaccessible and protected after the key expires. The same key is used on multiple fields from multiple records. In some implementations, multiple keys with associated time windows are stored in the system. For example, two keys with staggered but overlapping time windows means that a given piece of data will be available for detokenization for at least one of the time windows, and up to a maximum of two of these time windows, depending on when the data is first tokenized.

In one implementation, a first raw log record including a first set of one or more fields storing first raw data related to a first event that occurred in a first application is received. A first raw value of a first field from the first set of fields is encrypted to generate a first token using a symmetric key encryption mechanism based on a first cryptographic key associated with a first time window after which the first cryptographic key is no longer valid for tokenization of raw fields of raw log records and with a second time window after which the first cryptographic key is no longer valid for detokenization of tokens. A first tokenized log record generated based on the first raw log record and the first token is output to be used by one or more log record consumers. After the first time window has elapsed, a second raw log record including a second set of one or more fields storing second raw data related to a second event that occurred in a second application is received. A second raw value of a second field from the second set of fields is encrypted to generate a second token using the symmetric key encryption mechanism based on a second cryptographic key that is different from the first cryptographic key. The second cryptographic key is associated with a third time window that occurs after the first time window and after which the second cryptographic key is no longer valid for tokenization of raw fields of raw log records and with a fourth time window after which the second cryptographic key is no longer valid for detokenization of tokens. A second tokenized log record generated based on the second raw log record and the second token is output to be used by one or more log record consumers.

Figure 2C:
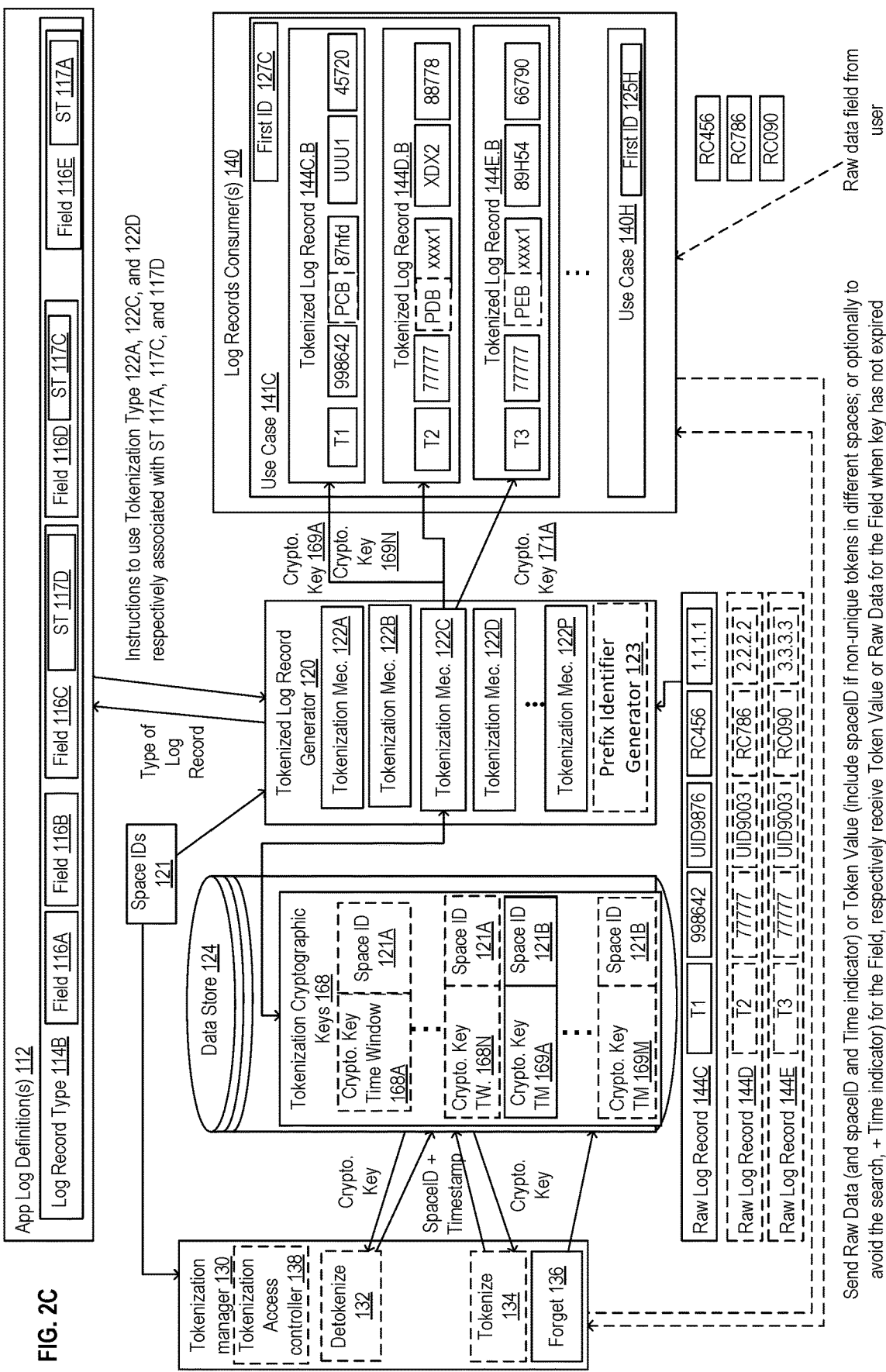
FIG. 2C illustrates a block diagram for tokenization of a field of a log record based on a time window tokenization approach in accordance with some implementations.

FIG. 2C illustrates a block diagram for tokenization of a field of a log record based on a time window encryption tokenization approach in accordance with some implementations. In the example of FIG. 2C, the tokenization of field 116D based on the tokenization mechanism 122C as identified by the ST 117C in the app log definition 112. In this example, the tokenized log record generator 120 receives three raw log records 144C, 144D, and 144E. Each log record is received is associated with a respective time indicator T1, T2, T3. In some implementations, the time indicator indicates a time at which the event occurred in the system or alternatively a time at which the log record for the event was recorded. In some implementations, the time indicator indicates a time and a date for that log record. In the illustrated example, T3, T2, and T1 occurred in different time periods and T3 occurred prior to T2, and T2 occurred prior to T1.

The value of the field 116D of each raw log record is tokenized based on the tokenization mechanism 122C and based on the time indicator Ti. The tokenization mechanism 122C encrypts the value of the field 116D (e.g., RC456, RC786, or RC090) with one of the keys from the cryptographic keys 168. The cryptographic keys 168 includes a set of one or more keys for each space (e.g., keys 168A-N for space ID 121A, keys 169A-169M for space ID 121B). While the example illustrates two sets of keys for two spaces identified by two space IDs, in other implementations, additional or less sets of keys can be included for additional spaces.

Each key from the keys 168 is associated with a time window indicating a time interval for which the key is to be used to tokenize new records. In some implementations, a first key is used as a current key for encrypting fields of new records received by the TLRG 120 during a time window. After the time window has elapsed, the key is no longer used for tokenizing new records. For example, the key can be used for a number of days, a number of weeks or a number of months. In some implementations, the key is kept as a previous key to enable the tokenization manager 130 to tokenize or detokenize data associated with previously tokenized records. The tokenization manager 130 may use one or more other keys for encrypting or decrypting fields of records received during a time interval that precedes the time interval associated with the current key. After a predetermined period of time a key is discarded or is no longer used to encrypt or decrypt data.

In some implementations, each one of the keys is used for the same interval of time. In non-limiting example, each key can be used for a month, 2 months, or N number of months. For example, a first key is used for the entire month of January, and another key is used for the month of February. In another implementation, each key may be associated with a time window of different length. For example, a first key is used for one month, while another key can be used for 2 months. Any combination of these implementations can be contemplated. For example, when the current key is associated with the current month, any data received is encrypted based on that key, while any data that was received by the TLRG 120 in the month that preceded the current month was encrypted with a different key associated with a different time window.

For example, first keys 168A and 169A allow for tokenization/detokenization of current raw log records fields for an interval of 1 month respectively for space ID 121A and space ID 121B. Keys 168N and 169M allow for detokenization of tokenized log record that were tokenized by the TLRG 120 at a time window that precedes the time window associated with the first keys.

As an example, raw log record 144E was tokenized when received at the TLRG 120 based on the time indicator T3 and the key 171A; raw log record 144D was tokenized when received at the TLRG 120 based on the time indicator T2 and the key 169N; and raw log record 144C is tokenized when received at the TLRG 120 based on the time indicator T1 and the key 169A. In this example, the key 169A is the current key that is used by the TLRG 120 to tokenize new raw log records. The key 169A is a previous key associated with a previous time window. The key 169M is no longer used to tokenize log records when received at the TLRG 120. Instead the key 169M is used by the tokenization manager 130 to tokenize or detokenize previously tokenized log records (which were initially tokenized by the TLRG 120 based on the key 169M). The key 171A is an expired key and can no longer be used by the tokenization manager 130 or the TLRG 120.

The field 116D of raw log record 144C is tokenized based on the current key 169A to obtain UUU1 in tokenized log record 144C.B in use case 141C. A user may request to tokenize 134, detokenize 132 the raw field or the tokenized field based on the key 169A since the key is still valid. The field 116D of raw log record 144D was tokenized based on a previous key 169N and obtain XDX2 in tokenized log record 144D.B for use case 141C. A user may request to tokenize 134, detokenize 132 the raw field or the tokenized field based on the key 169M. The field 116D of raw log record 144E is tokenized based on a previous key 171A and obtain 89H54 in tokenized log record 144E.B for use case 141C. A user may request to tokenize 134, detokenize 132 the raw field or the tokenized field based on the key 171M, however the tokenization or detokenization cannot be performed as the key 171 has expired. In some implementations, the tokenization manager 130 allows detokenization or tokenization of data related to a log record that was previously tokenized upon determination that the user making the request is authorizes to obtain the raw data value from the token or alternatively to obtain the token from the raw data value. In these implementations, data is automatically forgotten in the log records once the key expires and tokenization or detokenization of previously tokenized records can no longer occur.

The time window encryption tokenization mechanism (which may be referred to as short term support) can be implemented using symmetric key encryption with a key for each time window (e.g., a key per month). A first cryptographic key (e.g., 168N) for tokenization during a first time window. The first cryptographic key is associated with a first time window after which the first cryptographic key is no longer valid for tokenization of raw fields of raw log records and with a second time window after which the first cryptographic key is no longer valid for detokenization of tokens. After the first time window has elapsed, a second cryptographic key that is different from the first cryptographic key is used for tokenization during a third time window. The second cryptographic key is associated with a third time window that occurs after the first time window and after which the second cryptographic key is no longer valid for tokenization of raw fields of raw log records and with a fourth time window after which the second cryptographic key is no longer valid for detokenization of tokens.

In one exemplary implementation, the time window encryption tokenization mechanism (which may be referred to as short term support) can be implemented using symmetric key encryption with a new tokenization key for each month that is to be valid for detokenization for 2 months. After 2 months, the key is destroyed and the value cannot no longer be detokenized. This means that detokenization can occur for at least 1 month, but up to 2, depending upon if the value was tokenized at the beginning, middle or end of a month.

Figure 6:
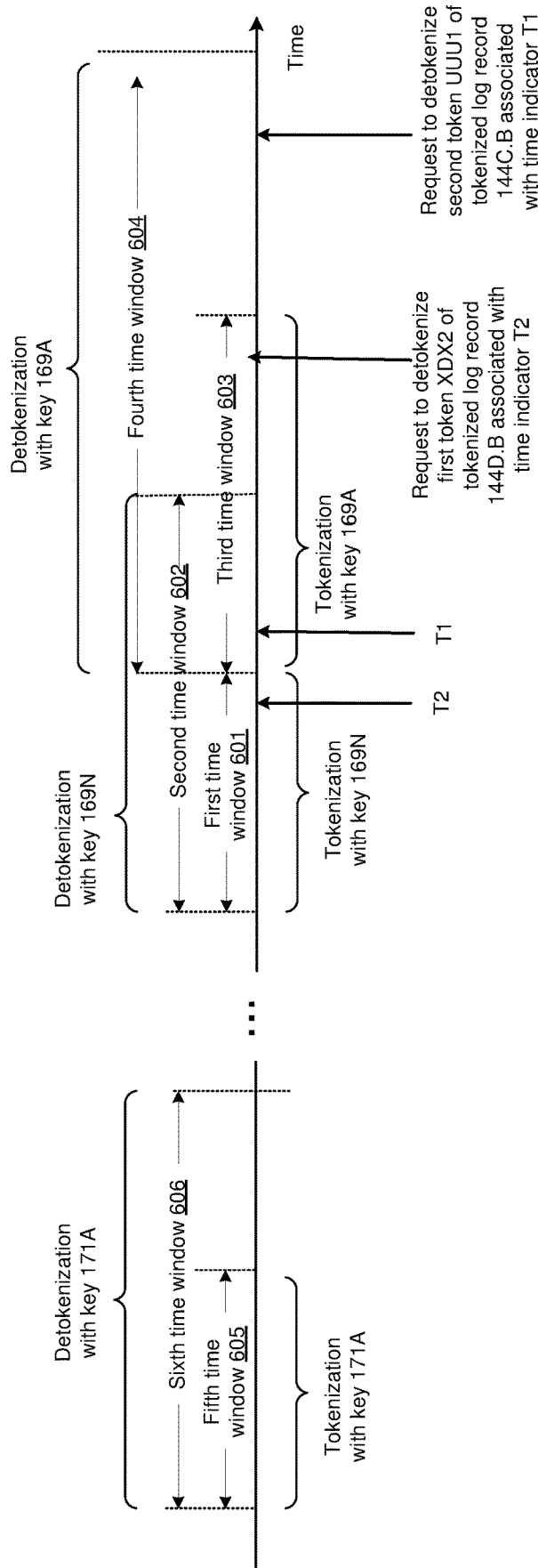
FIG. 6 illustrates exemplary cryptographic keys and associated time windows that can be used in a time window tokenization mechanism according to some implementations.

FIG. 6 illustrates exemplary cryptographic keys and associated time windows that can be used in a time window tokenization mechanism according to some implementations. In the illustrated example, each one of the keys 169A, 169N, and 171A are associated with two time windows. The key 169A is referred to as the second cryptographic key, the key 169N is referred to as the first cryptographic key, and the key 171A is referred to as a third cryptographic key. The first cryptographic key 169N is used for tokenization during a first time window, which occurred before the current time. The key 169N can be referred to as a previous key, which was previously used to encrypt raw log records received in the system prior to the key 169A becoming the tokenization key for the system. The first cryptographic key 169N is associated with a first time window 601 after which the first cryptographic key 169N is no longer valid for tokenization of raw fields of raw log records. The key 169N is further associated with a second time 602 window after which the first cryptographic key is no longer valid for detokenization of tokens. The key 169A, which is the key currently available for tokenizing raw log records received in the system 100 and which is different from the first cryptographic key 169N, is used for tokenization during a third time window 603. The third time window 603 starts after the first time window 601 elapses. The second cryptographic key 169A is further associated with a third time window 603 after which the second cryptographic key is no longer valid for tokenization of raw fields of raw log records. The second cryptographic key 169A is also associated with a fourth time window 604 after which the second cryptographic key is no longer valid for detokenization of tokens.

The key 171A is a key that was used by the system for time window tokenization in the past. The key 171A is no longer valid for tokenization and no longer valid for detokenization. The fifth time window 605 has elapsed and the sixth time window 606 has also elapsed such that no tokenization can be performed using the key 171A and no detokenization of tokens previously tokenized based on this key can be detokenized.

In some implementations a key is no longer valid for tokenization if the first cryptographic key expires. In other implementations, a key is no longer valid for tokenization when it is deleted.

The operations in the flow diagrams of FIGS. 7-8A-B will be described with reference to the exemplary embodiments of the FIG. 2C. However, it should be understood that the operations of the flow diagrams can be performed by embodiments of the invention other than those discussed with reference to these other figures, and the embodiments of the invention discussed with reference to these other figures can perform operations different than those discussed with reference to the flow diagrams.

Figure 7:
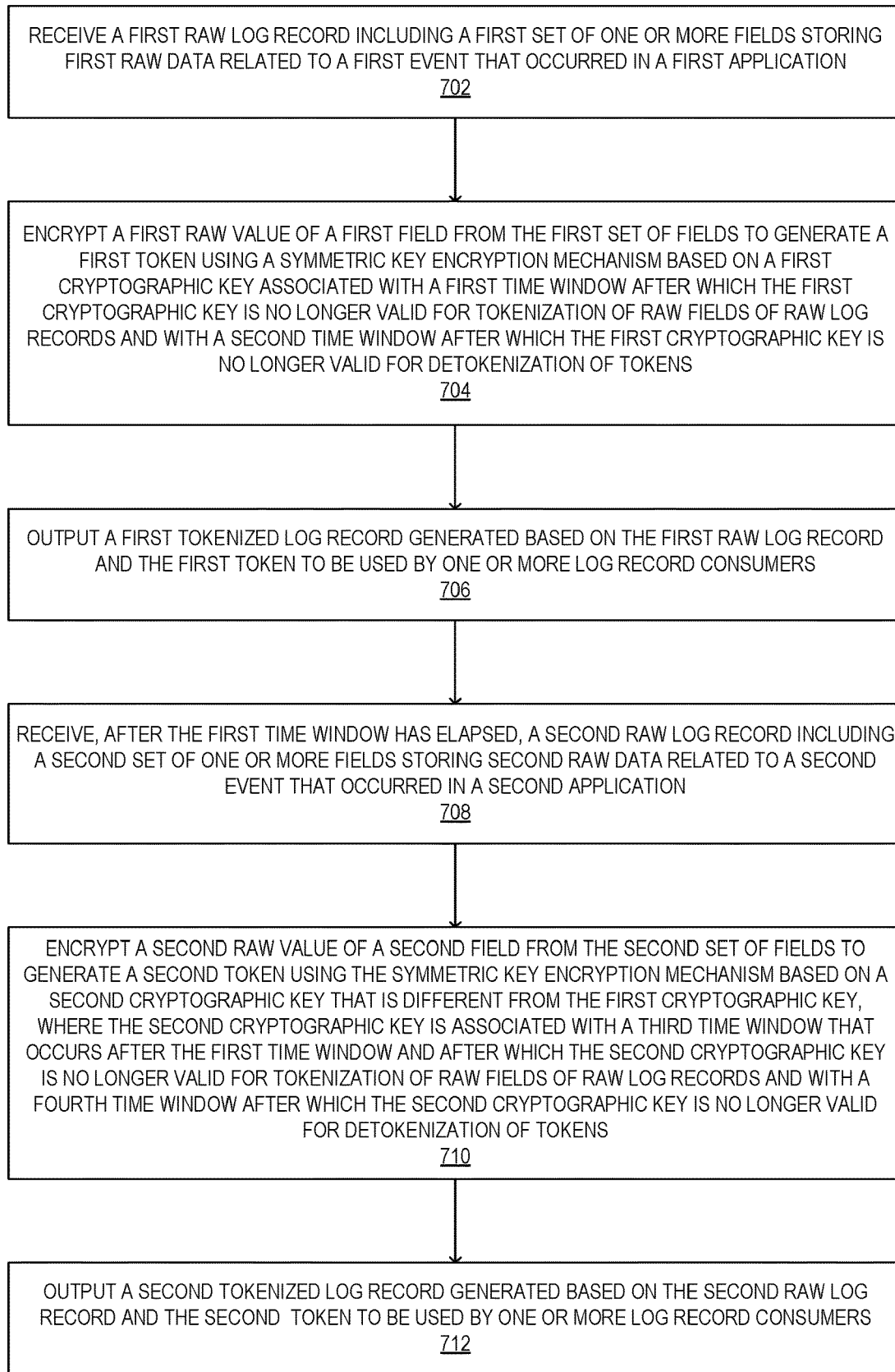
FIG. 7 illustrates a flow diagram of exemplary operations for tokenization of raw values based on time window encryption tokenization in accordance with some implementations.

FIG. 7 illustrates a flow diagram of exemplary operations for tokenization of raw values based on time window encryption tokenization in accordance with some implementations.

At operation 702, a first raw log record, e.g., 144D, including a first set of one or more fields storing first raw data related to a first event that occurred in a first application is received. At operation 704, a first raw value, e.g., RC786, of a first field from the first set of fields is encrypted to generate a first token, e.g., XDX2, using a symmetric key encryption mechanism, e.g., 122C, based on a first cryptographic key, e.g., 169N, associated with a first time window, e.g., 601, after which the first cryptographic key is no longer valid for tokenization of raw fields of raw log records and with a second time window, e.g., 602, after which the first cryptographic key is no longer valid for detokenization of tokens.

At operation 706, a first tokenized log record 144D.B generated based on the first raw log record 144D and the first token is output to be used by one or more log record consumers, e.g., use case 141C. At operation 708, after the first time window has elapsed, a second raw log record, e.g., 144C, including a second set of one or more fields storing second raw data related to a second event that occurred in a second application is received. At operation 710, a second raw value, e.g., RC456, of a second field from the second set of fields is encrypted to generate a second token, e.g., UUU1, using the symmetric key encryption mechanism, 122C, based on a second cryptographic key, e.g., 169A, that is different from the first cryptographic key, 169N. The second cryptographic key is associated with a third time window, e.g., time window 603, that occurs after the first time window and after which the second cryptographic key is no longer valid for tokenization of raw fields of raw log records and with a fourth time window, e.g., time window 604, after which the second cryptographic key is no longer valid for detokenization of tokens. At operation 712, a second tokenized log record generated based on the second raw log record and the second token is output to be used by one or more log record consumers.

Figure 8A:
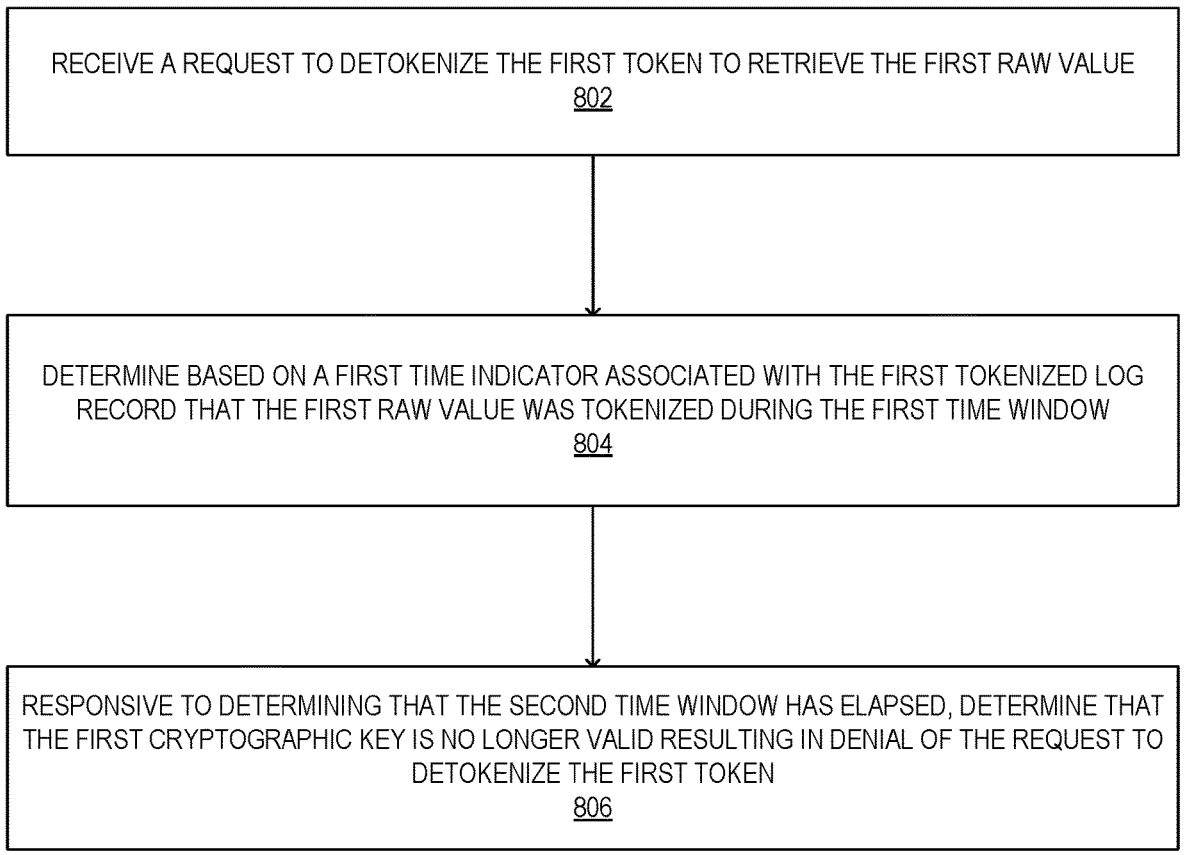
FIG. 8A illustrates a flow diagram of exemplary operations for detokenization of tokens based on time window cryptographic keys in accordance with some implementations.

FIG. 8A illustrates a flow diagram of exemplary operations for detokenization of tokens based on time window cryptographic keys in accordance with some implementations. At operation 802, a request to detokenize a first token to retrieve the first raw value is received. For example, a request to detokenize the token XDX2 in tokenized log record 144D.B is received. At operation 804, a determination that the first raw value was tokenized during the first time window 601 is performed based on a first time indicator associated with the first tokenized log record, e.g., the time indicator T2. At operation 806, responsive to determining that the second time window 602 has elapsed, determining that the first cryptographic key 169N is no longer valid resulting in denial of the request to detokenize the first token. The first time indicator (T2) indicates a time and date at which the first raw log record 144D was recorded in the system, a time and date at which the first event occurred in the first application, and/or a time and date at which the first tokenized log record was generated. In some implementations, the tokenization manager 130 allows detokenization of data related to a log record that was previously tokenized upon determination that the user making the request is authorized to obtain the raw data value from the token.

Figure 8B:
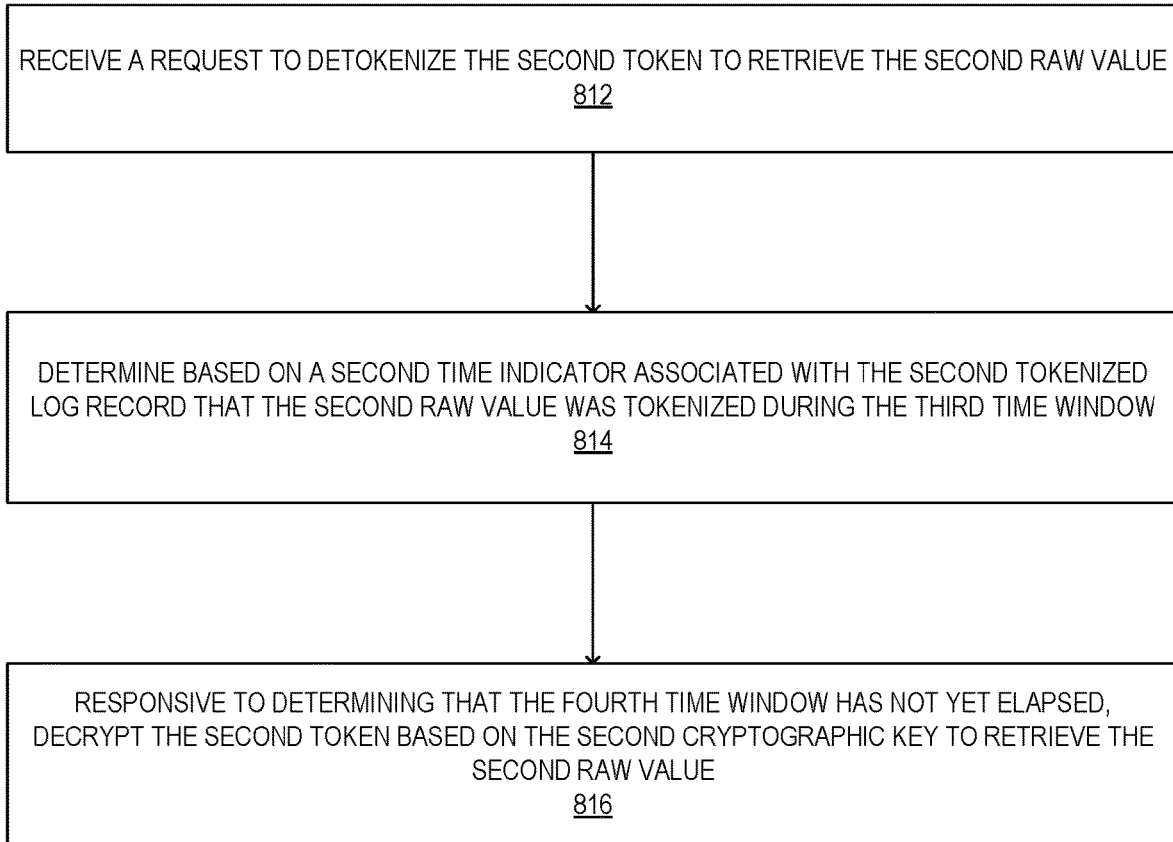
FIG. 8B illustrates a flow diagram of exemplary operations for detokenization of tokens based on time window cryptographic keys in accordance with some implementations.

FIG. 8B illustrates a flow diagram of exemplary operations for detokenization of tokens based on time window cryptographic keys in accordance with some implementations. At operation 812, a request to detokenize the second token, e.g., UUU1, to retrieve the second raw value is received. At operation 814, a determination that the second raw value was tokenized during the third time window, 603, is performed based on a second time indicator T1, associated with the second tokenized log record 144C.B. At operation 814, responsive to determining that the fourth time window 604 has not yet elapsed, decrypting the second token based on the second cryptographic key to retrieve the second raw value RC456. The second time indicator indicates a time and date at which the second raw log record was recorded in the system, a time and date at which the second event occurred in the first application, and a time and date at which the second tokenized log record was generated. In some implementations, the tokenization manager 130 allows tokenization of data related to a log record that was previously tokenized upon determination that the user making the request is authorized to obtain the token from the raw value.

While the operations herein are described with reference to a first and a second cryptographic key in other embodiments more than two keys can be stored in the system with overlapping time periods for detokenization without departing from the scope of the present invention.

In some implementations, the second time window and the fourth time window are respectively shorter than a period of time within which personal data is to be forgotten responsive to a request from a user. While FIG. 6 illustrates time windows of different lengths, for example, the first time window and the second time window are different in length, in some implementations the first time window and the second time window are the same. Further, while the first time window and the third window are illustrated in FIG. 6 as being of different lengths, in some implementations, the first and the third time window are of the same length such that each one of the first key and the second key can be used for a same amount of time that occurs one after the other.

Time window tokenization mechanisms strikes a balance between having to manage too many keys and a desire to allow for detokenization during a period of time. While time window tokenization mechanisms may not allow for a specific field of a specific log record to be forgotten as it is the case for one to one mapping tokenization, they provide efficient mechanisms for ensuring that the data in the fields of the records will be forgotten within a period of time (e.g., after expiration of the key or deletion of the key after the time period associated with detokenization ability has elapsed for that particular key). In one implementation, the period of time after which detokenization is no longer valid with a specific key is set such that it is shorter than the period of time within which data must be forgotten responsive to a request from a user that the data be forgotten. This tokenization mechanism can also be used to tokenize data that can be detokenized in the system for a predetermined period of time (as per regulations and requirements regarding privacy and the handling of the data), or as a fall back strategy in cases where a linked encryption tokenization mechanism is desired but there is no user data in the record that can be used to tokenize the user traceable data field.

The time window tokenization mechanisms present several advantages. The time window tokenization mechanisms are efficient as there is no need to store a large amount of data (only the keys need to be stored as opposed to the one to one mappings of tokens/raw value). This tokenization mechanism can be used in use cases where no RTBF support is needed (e.g., when the data is not personal user data) but the raw data cannot be retained indefinitely in the system. The time window tokenization allows for temporary detokenization and access to raw data with proper access rights and allows to automatically forget data by making the raw data no longer accessible from the tokenized data after the key expires.

Linked Encryption Tokenization:

Linked encryption tokenization is a mechanism for tokenization of user-traceable data that is not directly personal data but can be traced back to the identity or an activity of the user. In one implementation, a first raw value is encrypted into a first token using a symmetric key encryption mechanism based on a combination of a second raw value including personal data of a user and a second token resulting from the tokenization of the second raw value. The first token is an anonymized representation of the first raw value.

This mechanism links the tokenization of fields that do not include personal data, but can be traced back to the user, with the personal data of the user (in other words, fields that do not include personal data, but include data that can be traced back to the user, are tokenized at least in part using personal data such that the detokenization is dependent upon having the personal data).

As a result, where the user can request their personal data be forgotten, the user-traceable data may be forgotten (will be made non-detokenizable) upon request because the forgetting of the user's personal data (which is part of the key used to tokenize the linkable data) means that the user-traceable data can no longer be detokenized.

The linked encryption tokenization mechanism is efficient (in terms of storage and management) for tokenization of the user traceable data with RTBF support. The linked encryption tokenization supports an on-demand ability to be forgotten as opposed to a time window RTBF ability that is associated with the expiration of a key and this is enabled without requiring a 1 to 1 mapping of token to data be stored for each field of user traceable data.

Figure 2D:
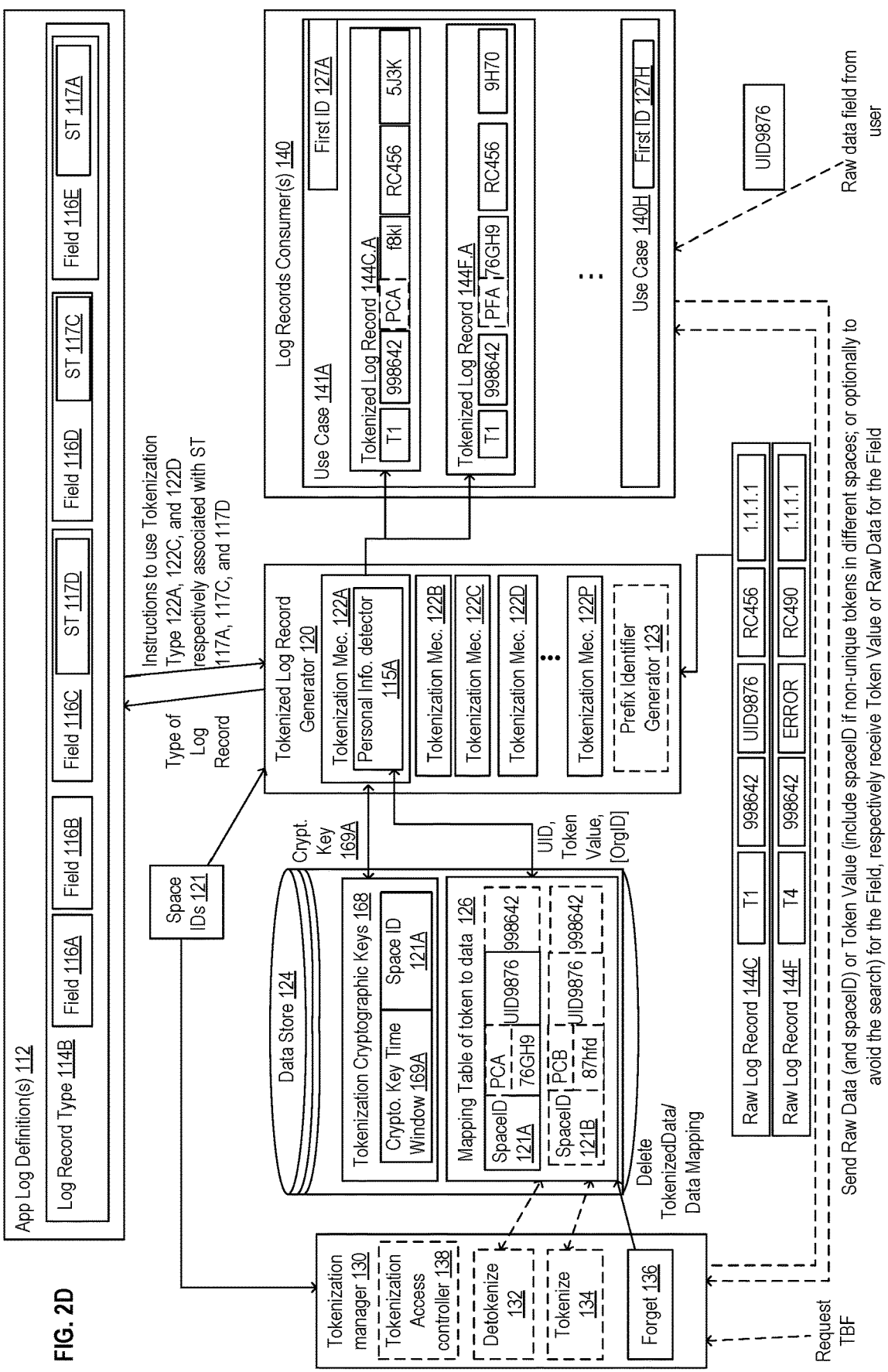
FIG. 2D illustrates a block diagram for tokenization of a field of a log record with a linked encryption tokenization in accordance with some implementations.

FIG. 2D illustrates a block diagram for tokenization of a field of a log record with a linked encryption tokenization in accordance with some implementations. FIG. 2D illustrates an exemplary tokenization of field 116E for the use case 141A based on the strategy 117A defined in the app log definition 112 for this field. Similar operations as the one described with reference to the other figures can be performed for the other fields of the raw log records.

In some implementations, the first ID 127A indicates that the field 116E of records of record type 114B is to be tokenized based on space ID 121A for use case 141A. ST 117A indicates that tokenization mechanism 122A is to be used. Upon receipt of a raw log record (e.g., 144C, 144F), the personal information detector 115A determines whether the field to be tokenized is associated with personal data and whether the personal data is recorded in a field of the raw log record 144C.

For example, raw log record 144C includes an IP address 1.1.1.1 as a value of the field 116E and is associated with a user ID UID9876 which represents personal data. When the field to be tokenized is associated with a personal data field in the record, the tokenization mechanism 122A is performed based on this data. In one implementation, the user ID in the record is used as part of a key to encrypt the raw data field and obtain the tokenized data field of tokenized log record 144C.A. In one implementation, the key that is based on the user ID is a combination of the user ID and the token stored in the mapping table 126 for that user ID. In one example, the combination can be a concatenation of the user ID and its tokenized value (which may include or not the meta data, where the meta data can be stored as a prefix (as illustrated in FIG. 2D) or can be stored through other mechanisms in association with the user ID), a hash of the concatenation, one of the user ID and tokenized value can be used as a key and the other one is used as an initialization vector, or any other types of combination. In some implementations, for example, in a multi-tenant environment, the Organization ID identifying the organization to which the user belongs can be used in addition to the user ID to be part of the key for encrypting the raw field in the tokenization mechanism 122A. In other implementations, the organization ID is not used.

In some examples, the raw log record may not include personal data associated with the field to be tokenized. For example, the raw log record 144F includes an ERROR in the field of the user ID indicating that the user ID was not recorded in the log record when the event occurred in an application. This may be due to an error of a user when entering the user ID or to a bug, or other type of errors resulting in the user ID not being recorded in the raw log record. Instead the field value may include a code indicative of the ERROR. Upon determination, at the personal information detector 115A that the field does not include the personal data (e.g., by detecting that a code indicative of an error is included in the field of the raw log record 144F), the tokenization mechanism 122A is performed by encrypting the raw field with a cryptographic key retrieved from the set of keys 168. The key 169A is associated with a time window for which the key is still to be used for tokenization. The tokenized log record 144F.A is obtained in which the token value 9H70 is obtained for the field E based on the tokenization mechanism 122A and the determination that an error occurred in the personal data recordation.

The tokenization manager 130 enables users of the system to access the keys 168 and/or the mapping table 126 when proper access rights have been granted to the user to tokenize 134 or detokenize 132 the field E based on the tokenization mechanism 122A depending on whether the personal data was used or not during the initial tokenization of a log record. The tokenization access controller 138 determines authorization of access to perform the operations 132, 134, or 136 based on one or more of the identification of the user attempting to perform the operation (e.g., the user can be a user of the log consumers, a use case, a log consumer, a user that is the owner of the personal data, etc.), the space ID in which the token was generated, and the strategy type identifying the tokenization mechanism with which the token was generated. In additional or alternative implementations, the access authorization can further be based on the type of log record, the field that is to be accessed, the use case attempting the access, a time at which the access is attempted. When the access is authorized, key or raw data is sent to consumers depending on authorization levels for the consumer.

Upon receipt of a request to be forgotten, the forget 136 deletes the mapping of the user ID/token in the mapping table 126 resulting in the key used for tokenizing the field 116E of tokenized log record 144C.A to be inaccessible and therefore the records including the field 116E to be completely anonymized. When the field 116E is tokenized based on the key 169A, the expiration of the key acts as an operation for forgetting the data.

In a non-limiting exemplary implementation, the tokenization strategy 117A can be used for tokenization of IP Address fields. The tokenization is based on linked personal data. For some use cases the IP Address appears. To support RTBF—an IP address becomes associated to a user identifier which makes it so that each IP address ends up being distinct per user instead of shared if two users are using the same IP address. For the general case, one can fall back to use the time window tokenization mechanism to tokenize the IP address for the general space in order to make it so that we will not be able to get back to the IP address in the general space. The restricted token is always constant per IP address so that use cases needing to find all requests stemming from a single IP address can be able to be handled.

The operations in the flow diagram of FIG. 9 will be described with reference to the exemplary embodiments of the FIG. 2D. However, it should be understood that the operations of the flow diagrams can be performed by embodiments of the invention other than those discussed with reference to these other figures, and the embodiments of the invention discussed with reference to these other figures can perform operations different than those discussed with reference to the flow diagrams.

Figure 9:
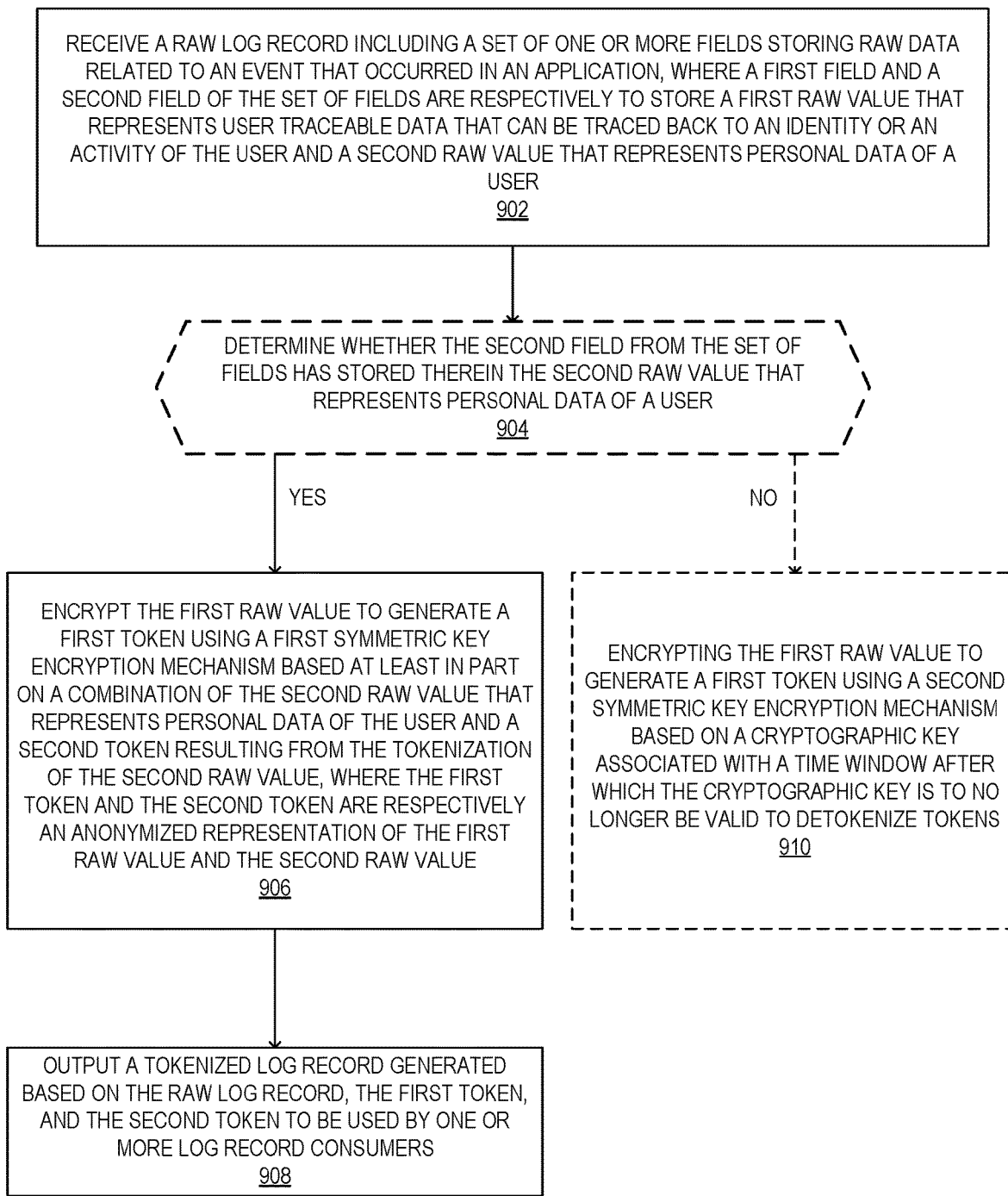
FIG. 9 illustrates a flow diagram of exemplary operations for tokenization of user traceable data for enabling support of a right to be forgotten privacy requirement upon receipt of a request to be forgotten from a user of a system that handles log records resulting from operations of one or more applications used by the user in accordance with some implementations.

FIG. 9 illustrates a flow diagram of exemplary operations for tokenization of user traceable data for enabling support of a right to be forgotten privacy requirement upon receipt of a request to be forgotten from a user of a system that handles log records resulting from operations of one or more applications used by the user in accordance with some implementations.

At operation 902, a raw log record, e.g., log record 144C or raw log record 144F, is received. The raw log record includes a set of one or more fields storing raw data related to an event that occurred in an application. A first field and a second field of the set of fields are respectively to store a first raw value that represents user traceable data that can be traced back to an identity or an activity of the user and a second raw value that represents personal data of a user. For example, the first raw value is an IP address of a device used by the user when accessing the application and the second raw value is a user identifier. Other examples of user traceable data or of personal data can be contemplated without departing from the scope of the present implementations.

At operation 906, the first raw value is encrypted to generate a first token using a first symmetric key encryption mechanism 122A based at least in part on a combination of the second raw value that represents personal data of the user and a second token resulting from the tokenization of the second raw value. The first token and the second token are respectively an anonymized representation of the first raw value and the second raw value.

In one implementation, the combination of the second raw value and the second token is used as a key of the symmetric key encryption mechanism. The combination of the second raw value and the second token can be a concatenation of the second raw value and the second token or a hash of the concatenation of the second raw value and the second token. In another implementation, one of the second raw value and the second token is used as a key for the symmetric key encryption mechanism and the other one of the second raw value and the second token is used as an initialization vector of the symmetric key encryption mechanism.

In some implementations, the raw log record was generated responsive to activity of a first of a plurality of organizations assigned different organization identifiers in a multi-tenant system, and wherein the encrypting of the first raw value to generate the first token using the first symmetric key encryption mechanism based at least in part on the combination of the second raw value and the second token is further based on an organization identifier uniquely identifying the first of the plurality of organizations.

At operation 908, a tokenized log record generated based on the raw log record, the first token, and the second token is output to be used by one or more log record consumers.

In some implementations, prior to encrypting the first raw value, at operation 904, a determination of whether the second field from the set of fields has stored therein the second raw value that represents personal data of a user is performed. In one implementation, the encryption of the first raw value is performed further in response to determining that the second field from the set of fields has stored therein the second raw value that represents personal data of a user. In another implementation, responsive to determining that the second field from the set of fields does not have stored therein the second raw value, the flow of operations move to operation 910 at which the first raw value is encrypted to generate a first token using a second symmetric key encryption mechanism (e.g., time window tokenization) based on a cryptographic key associated with a time window after which the cryptographic key is to no longer be valid to detokenize tokens. In some implementations, the time window after which the cryptographic key is to no longer be valid to detokenize tokens is shorter than a period of time within which personal data is to be forgotten responsive to a request from the user. In some implementations, the time window tokenization mechanism is performed as described with reference to FIGS. 2C, 6-8B.

In some implementations, the tokenization of the second raw value includes generation of a one to one mapping between the second raw value and the second token and storage of the one to one mapping. For example, the tokenization of the second raw value is performed as described with respective to the one to one mapping tokenization of FIG. 2A.

When a request to forget the user is received in the system, the one to one mapping between the second raw value and the second token is deleted resulting in the first token to no longer be detokenizable based on the one to one mapping. Thus, while the first token is not stored in a one to one mapping with the raw value from which it was generated, the linked encryption tokenization allows for a support of RTBF and enables the user traceable data to be forgotten.

Figure 10:
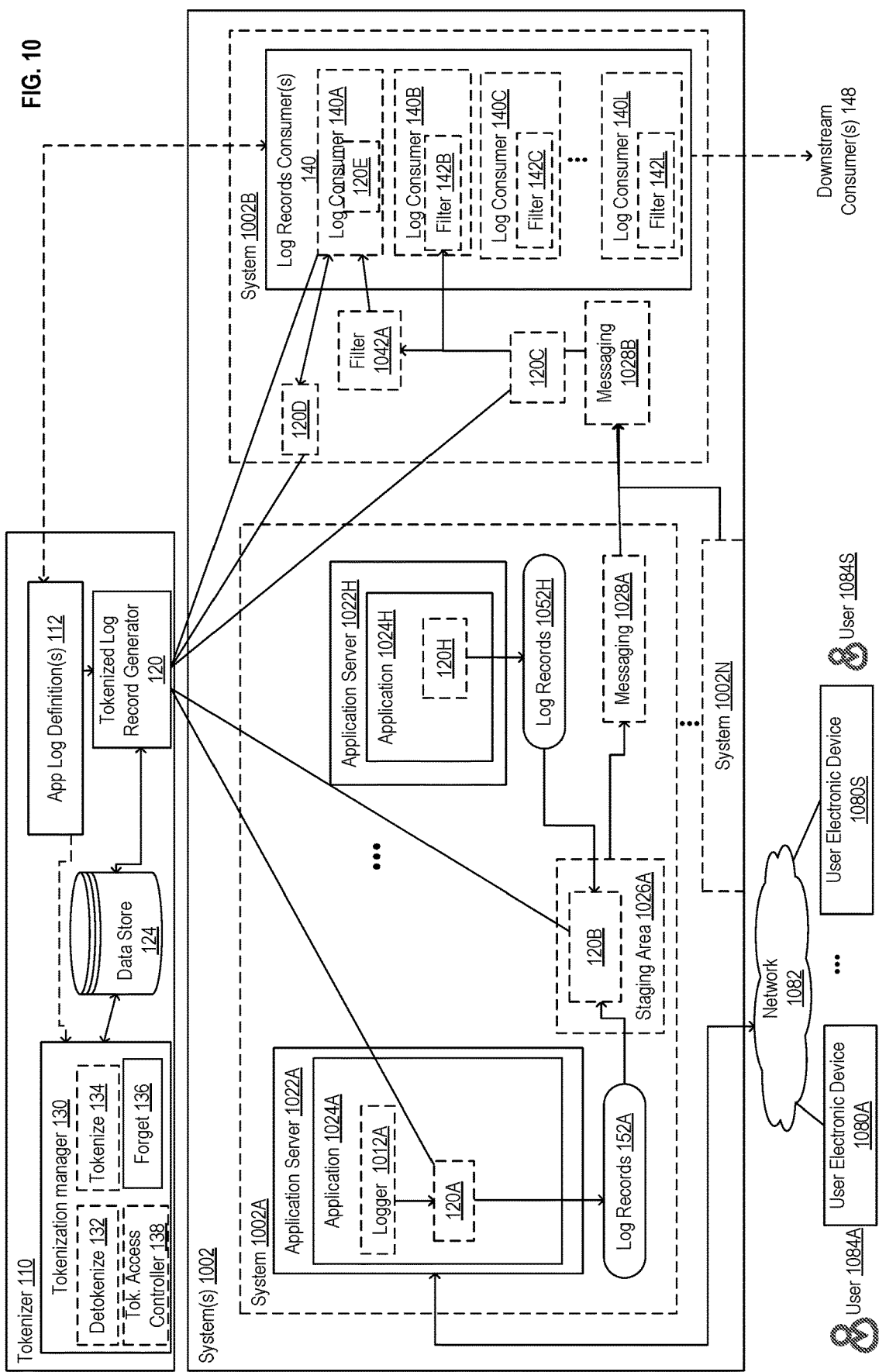
FIG. 10 illustrates a block diagram of exemplary deployment for the system 100 for handling personal data according to some implementations.

FIG. 10 illustrates a block diagram of exemplary deployment for the system 100 for handling personal data according to some implementations. The system 1002 includes a first and a second system 1002A, 1002B. in other implementations, a single system includes all the components of the system 1002. The system 1002A includes one or more application servers 1022A-H. Each application server includes one or more application 1024A running. When in operation the applications 1024A-H include a logger 1012R that records events or transactions that occur in the application as log records. The log records 152A obtained from the applications are collected and aggregated in a staging area 1026A (e.g., in a combined in a stream of log files) to be transported through a messaging mechanism 1028A towards another messaging mechanism 1028B that receives the log records to be consumed by use cases at the log record consumers 140. Each of the log record consumers may include one or more use cases (not illustrated here). In some implementations, each use case is associated with a space. In other implementations, each use case is associated with a viewer access right that determines for each field of a tokenized log record the space in which the field is to be viewed. The tokenized log record 120 can be implemented as any of the 120A, 120B, 120C, 120D, or 120E to tokenize the log records as described with the preceding figures. In some implementations, a unified tokenized log record is passed on from system 1002A to system 1002B where the log consumers are operative to retrieve the needed tokenized values based on a filtering process in the filters 142A-L. In other implementations, a raw log record is passed on from the system 1002A to the system 1002B and the tokenizer 120C, 120D, or 120E is operative to perform the tokenization for the use cases of the log record consumers 140.

The Applications 1024A-H generate the log records. In some implementations, the logger 1012A is called by the application 1024A to generate a line for a log. In some implementations, the log lines are translated into log file (e.g., by a log writer not illustrated).

The term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

"Cloud computing" services provide shared resources, software, and information to computers and other devices upon request. In cloud computing environments, software can be accessible over the internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 11A:
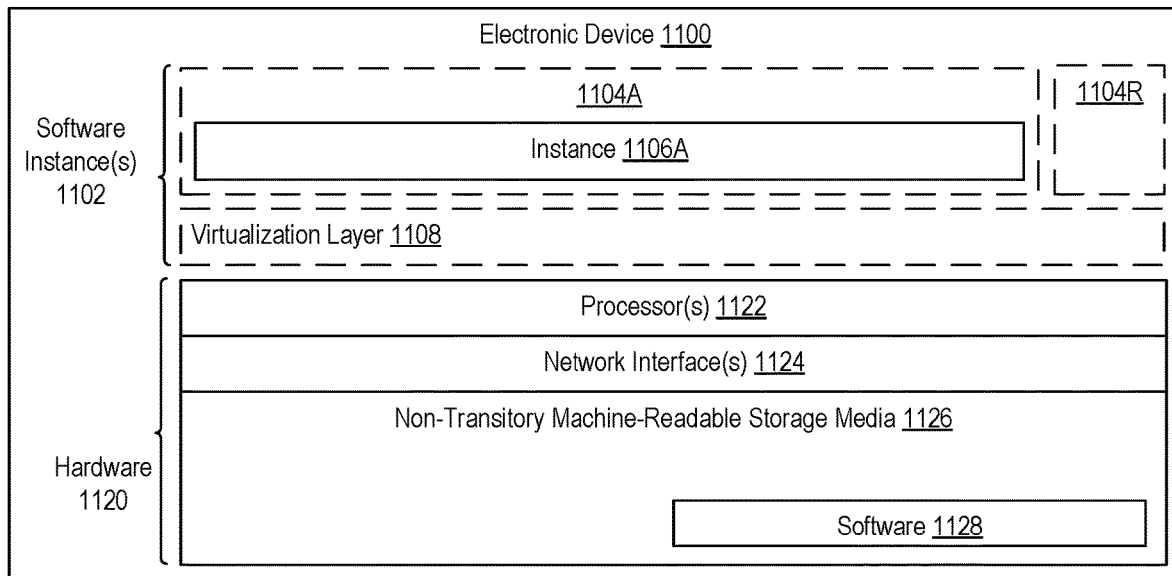
FIG. 11A is a block diagram illustrating an electronic device according to some example implementations.

FIG. 11A is a block diagram illustrating an electronic device 1100 according to some example implementations. FIG. 5A includes hardware 1120 comprising a set of one or more processor(s) 1122, a set of one or more network interfaces 1124 (wireless and/or wired), and non-transitory machine-readable storage media 1126 having stored therein software 1128 (which includes instructions executable by the set of one or more processor(s) 1122). Each of the previously described end user clients and the tokenizer 110, and the log record consumers 140 may be implemented in one or more electronic devices 1100. In one implementation: 1) each of the end user clients is implemented in a separate one of the electronic devices 1100 (e.g., in user electronic devices operated by users where the software 1128 represents the software to implement end user clients to interface with the applications and the log record consumers (e.g., a web browser, a native client, a portal, a command-line interface, and/or an application program interface (API) based upon protocols such as Simple Object Access Protocol (SOAP), Representational State Transfer (REST), etc.)); 2) the tokenizer 110 and the log record consumers 140 are implemented in a separate set of one or more of the electronic devices 1100 (e.g., a set of one or more server electronic devices where the software 1128 represents the software to implement the tokenizer and/or the log record consumers); and 3) in operation, the electronic devices implementing the end user clients and the tokenizer 110, and the log record consumers 140 would be communicatively coupled (e.g., by a network) and would establish between them (or through one or more other layers) connections. Other configurations of electronic devices may be used in other implementations (e.g., an implementation in which the end user client and the tokenizer 110 and the log record consumers 140 are implemented on a single electronic device 1100).

In electronic devices that use compute virtualization, the set of one or more processor(s) 1122 typically execute software to instantiate a virtualization layer 1108 and software container(s) 1104A-R (e.g., with operating system-level virtualization, the virtualization layer 1108 represents the kernel of an operating system (or a shim executing on a base operating system) that allows for the creation of multiple software containers 1104A-R (representing separate user space instances and also called virtualization engines, virtual private servers, or jails) that may each be used to execute a set of one or more applications; with full virtualization, the virtualization layer 1108 represents a hypervisor (sometimes referred to as a virtual machine monitor (VMM)) or a hypervisor executing on top of a host operating system, and the software containers 1104A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 1128 (illustrated as instance 1106A) is executed within the software container 1104A on the virtualization layer 1108. In electronic devices where compute virtualization is not used, the instance 1106A on top of a host operating system is executed on the "bare metal" electronic device 1100. The instantiation of the instance 1106A, as well as the virtualization layer 1108 and software containers 1104A-R if implemented, are collectively referred to as software instance(s) 1102.

Alternative implementations of an electronic device may have numerous variations from that described above. For example, customized hardware and/or accelerators might also be used in an electronic device.

Figure 11B:
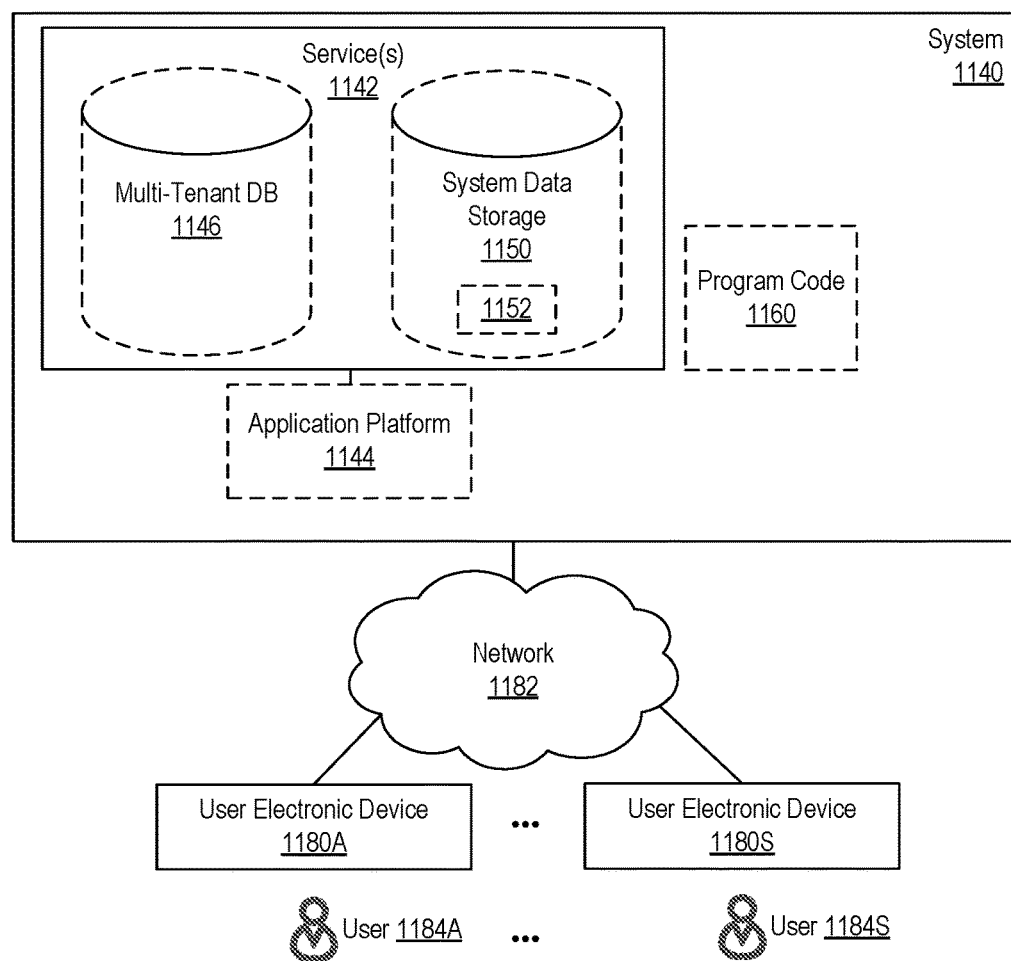
FIG. 11B is a block diagram of an environment where a system for enabling compliance with regulations and requirements regarding privacy and handling of data may be deployed, according to some implementations.

FIG. 11B is a block diagram of an environment where a tokenizer and log record consumers may be deployed, according to some implementations. A system 1140 includes hardware (a set of one or more electronic devices) and software to provide service(s) 1142, including the log consumers and/or the tokenizer. The system 1140 is coupled to user electronic devices 1180A-S over a network 1182. The service(s) 1142 may be on-demand services that are made available to one or more of the users 1184A-S working for one or more other organizations (sometimes referred to as outside users) so that those organizations do not need to necessarily be concerned with building and/or maintaining a system, but instead makes use of the service(s) 1142 when needed (e.g., on the demand of the users 1184A-S). The service(s) 1142 may communicate with each other and/or with one or more of the user electronic devices 1180A-S via one or more Application Programming Interface(s) (APIs) (e.g., a Representational State Transfer (REST) API). The user electronic devices 1180A-S are operated by users 1184A-S.

In one implementation, the system 1140 is a multi-tenant cloud computing architecture supporting multiple services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), an Artificial Intelligence service (e.g., Einstein by Salesforce.com, Inc.), and/or Infrastructure as a Service (IAAS) (e.g., virtual machines, servers, and/or storage). For example, system 1140 may include an application platform 1144 that enables PAAS for creating, managing, and executing one or more applications developed by the provider of the application platform 1144, users accessing the system 1140 via one or more of user electronic devices 1180A-S, or third-party application developers accessing the system 1140 via one or more of user electronic devices 1180A-S.

In some implementations, one or more of the service(s) 1142 may utilize one or more multi-tenant databases 1146, as well as system data storage 1150 for system data 1152 accessible to system 1140. In certain implementations, the system 1140 includes a set of one or more servers that are running on server electronic devices and that are configured to handle requests for any authorized user associated with any tenant (there is no server affinity for a user and/or tenant to a specific server). The user electronic device 1180A-S communicate with the server(s) of system 1140 to request and update tenant-level data and system-level data hosted by system 1140, and in response the system 1140 (e.g., one or more servers in system 1140) automatically may generate one or more Structured Query Language (SQL) statements (e.g., one or more SQL queries) that are designed to access the desired information from the one or more multi-tenant database 1146 and/or system data storage 1150.

In some implementations, the service(s) 1142 are implemented using virtual applications dynamically created at run time responsive to queries from the user electronic devices 1180A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 1160 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 1144 includes an application setup mechanism that supports application developers' creation and management of applications, which may be saved as metadata by save routines. Invocations to such applications, including the tokenizer 110, and the log record consumers 140, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 1182 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 4th generation wireless protocol (4G) (e.g., the Long Term Evolution (LTE) standard, LTE Advanced, LTE Advanced Pro), a fifth generation wireless protocol (5G), or similar wired and/or wireless protocols, and may include one or more intermediary devices for routing data between the system 1140 and the user electronic devices 1180A-S.

Each user electronic device 1180A-S (such as a desktop personal computer, workstation, laptop, Personal Digital Assistant (PDA), smart phone, augmented reality (AR) devices, virtual reality (VR) devices, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 1140. For example, the user interface device can be used to access data and applications hosted by system 1140, and to perform searches on stored data, and otherwise allow a user 1184 to interact with various GUI pages that may be presented to a user 1184. User electronic devices 1180A-S might communicate with system 1140 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 1180A-S might include an HTTP client, commonly referred to as a "browser," for sending and receiving HTTP messages to and from server(s) of system 1140, thus allowing users 1184 of the user electronic device 1180A-S to access, process and view information, pages and applications available to it from system 1140 over network 1182.

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is within the knowledge of one skilled in the art to affect such feature, structure, or characteristic in connection with other implementations whether or not explicitly described.

For example, the figure(s) illustrating flow diagrams are sometimes described with reference to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, implementations, other than those discussed with reference to the block diagrams, for performing the flow diagrams are within the scope of this description, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the detailed description and claims, the term "coupled," along with its derivatives, may be used. "Coupled" is used to indicate that two or more elements, which may or may not be in direct physical or electrical contact with each other, co-operate or interact with each other.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method of tokenization of user traceable data for enabling support of a right to be forgotten privacy requirement upon receipt of a request to be forgotten from a user of a system that handles log records resulting from operations of one or more applications used by the user, the method comprising:
   receiving a raw log record including a set of one or more fields storing raw data related to an event that occurred in an application, wherein a first field and a second field of the set of fields are respectively to store a first raw value that represents user traceable data that can be traced back to an identity or an activity of the user and a second raw value;
   determining whether the second field from the set of fields has stored therein the second raw value that represents personal data of a user;
   in response to determining that the second field from the set of fields has stored therein the second raw value that represents personal data of a user, encrypting the first raw value to generate a first token using a first symmetric key encryption mechanism based at least in part on a combination of the second raw value that represents personal data of the user and a second token resulting from the tokenization of the second raw value, wherein the first token and the second token are respectively an anonymized representation of the first raw value and the second raw value;
   responsive to determining that the second field from the set of fields does not have stored therein the second raw value, encrypting the first raw value to generate the first token using a second symmetric key encryption mechanism based on a cryptographic key associated with a time window after which the cryptographic key is to no longer be valid to detokenize tokens; and
   outputting a tokenized log record generated based on the raw log record, the first token, and the second token to be used by one or more log record consumers.

2. The method of claim 1, wherein the time window after which the cryptographic key is to no longer be valid to detokenize tokens is shorter than a period of time within which personal data is to be forgotten responsive to a request from the user.

3. The method of claim 1, wherein the tokenization of the second raw value includes generation of a one to one mapping between the second raw value and the second token and storage of the one to one mapping, and the method further comprises:
   responsive to receiving a request to forget the personal data of the user, deleting the one to one mapping between the second raw value and the second token so that the first token can no longer be detokenized based on the one to one mapping.

4. The method of claim 1, wherein the encrypting of the first raw value to generate the first token using the symmetric key encryption mechanism based at least in part on the combination of the second raw value and the second token resulting from the tokenization of the second raw value includes:
   using the combination of the second raw value and the second token as a key of the symmetric key encryption mechanism, wherein the combination is at least one of a concatenation of the second raw value and the second token and a hash of the concatenation of the second raw value and the second token.

5. The method of claim 1, wherein the encrypting of the first raw value to generate the first token using the symmetric key encryption mechanism based at least in part on the combination of the second raw value of the second field and the second token resulting from the tokenization of the second raw value includes:

using one of the second raw value and the second token as a key for the symmetric key encryption mechanism; and using the other one of the second raw value and the second token as an initialization vector of the symmetric key encryption mechanism.

6. The method of claim 1, wherein the raw log record was generated responsive to activity of a first of a plurality of organizations assigned different organization identifiers in a multi-tenant system, and wherein the encrypting of the first raw value to generate the first token using the first symmetric key encryption mechanism based at least in part on the combination of the second raw value and the second token is further based on an organization identifier uniquely identifying the first of the plurality of organizations.

7. A non-transitory machine readable medium that stores instructions that, when executed by one or more processors of electronic devices, cause the electronic devices to enable support of a right to be forgotten privacy requirement upon receipt of a request to be forgotten from a user of a system that handles log records resulting from operations of one or more applications used by the user, by performing the following operations:

receiving a raw log record including a set of one or more fields storing raw data related to an event that occurred in an application, wherein a first field and a second field of the set of fields are respectively to store a first raw value that represents user traceable data that can be traced back to an identity or an activity of the user and a second raw value;

determining whether the second field from the set of fields has stored therein the second raw value that represents personal data of a user;

in response to determining that the second field from the set of fields has stored therein the second raw value that represents personal data of a user, encrypting the first raw value to generate a first token using a first symmetric key encryption mechanism based at least in part on a combination of the second raw value that represents personal data of the user and a second token resulting from the tokenization of the second raw value, wherein the first token and the second token are respectively an anonymized representation of the first raw value and the second raw value;

responsive to determining that the second field from the set of fields does not have stored therein the second raw value, encrypting the first raw value to generate the first token using a second symmetric key encryption mechanism based on a cryptographic key associated with a time window after which the cryptographic key is to no longer be valid to detokenize tokens; and outputting a tokenized log record generated based on the raw log record, the first token, and the second token to be used by one or more log record consumers.

8. The non-transitory machine readable medium of claim 7, wherein the time window after which the cryptographic key is to no longer be valid to detokenize tokens is shorter than a period of time within which personal data is to be forgotten responsive to a request from the user.

9. The non-transitory machine readable medium of claim 7, wherein the tokenization of the second raw value includes generation of a one to one mapping between the second raw value and the second token and storage of the one to one mapping, and the operation further comprise:

responsive to receiving a request to forget the personal data of the user, deleting the one to one mapping between the second raw value and the second token so that the first token can no longer be detokenized based on the one to one mapping.

10. The non-transitory machine readable medium of claim 7, wherein the encrypting of the first raw value to generate the first token using the symmetric key encryption mechanism based at least in part on the combination of the second raw value and the second token resulting from the tokenization of the second raw value includes:

using the combination of the second raw value and the second token as a key of the symmetric key encryption mechanism, wherein the combination is at least one of a concatenation of the second raw value and the second token and a hash of the concatenation of the second raw value and the second token.

11. The non-transitory machine readable medium of claim 7, wherein the encrypting of the first raw value to generate the first token using the symmetric key encryption mechanism based at least in part on the combination of the second raw value of the second field and the second token resulting from the tokenization of the second raw value includes:

using one of the second raw value and the second token as a key for the symmetric key encryption mechanism; and using the other one of the second raw value and the second token as an initialization vector of the symmetric key encryption mechanism.

12. The non-transitory machine readable medium of claim 7, wherein the raw log record was generated responsive to activity of a first of a plurality of organizations assigned different organization identifiers in a multi-tenant system, and wherein the encrypting of the first raw value to generate the first token using the first symmetric key encryption mechanism based at least in part on the combination of the second raw value and the second token is further based on an organization identifier uniquely identifying the first of the plurality of organizations.

13. A system for tokenization of user traceable data for enabling support of a right to be forgotten privacy requirement upon receipt of a request to be forgotten from a user of a system that handles log records resulting from operations of one or more applications used by the user, the system comprising:

one or more processors; and a non-transitory machine-readable storage medium having stored therein instructions that, when executed by the one or more processors, cause the one or more processors to perform operations comprising:

receiving a raw log record including a set of one or more fields storing raw data related to an event that occurred in an application, wherein a first field and a second field of the set of fields are respectively to store a first raw value that represents user traceable data that can be traced back to an identity or an activity of the user and a second raw value;

determining whether the second field from the set of fields has stored therein the second raw value that represents personal data of a user;

in response to determining that the second field from the set of fields has stored therein the second raw value that represents personal data of a user, encrypting the first raw value to generate a first token using a first symmetric key encryption mechanism based at least in part on a combination of the second raw value that represents personal data of the user and a second token resulting from the tokenization of the second raw value, wherein the first token and the second token are respectively an anonymized representation of the first raw value and the second raw value;

responsive to determining that the second field from the set of fields does not have stored therein the second raw value, encrypting the first raw value to generate the first token using a second symmetric key encryption mechanism based on a cryptographic key associated with a time window after which the cryptographic key is to no longer be valid to detokenize tokens; and outputting a tokenized log record generated based on the raw log record, the first token, and the second token to be used by one or more log record consumers.

14. The system of claim 13, wherein the time window after which the cryptographic key is to no longer be valid to detokenize tokens is shorter than a period of time within which personal data is to be forgotten responsive to a request from the user.

15. The system of claim 13, wherein the tokenization of the second raw value includes generation of a one to one mapping between the second raw value and the second token and storage of the one to one mapping, and wherein the operations further comprise:

responsive to receiving a request to forget the personal data of the user, deleting the one to one mapping between the second raw value and the second token so that the first token can no longer be detokenized based on the one to one mapping.

16. The system of claim 13, wherein the encrypting of the first raw value to generate the first token using the symmetric key encryption mechanism based at least in part on the combination of the second raw value and the second token resulting from the tokenization of the second raw value includes:

using the combination of the second raw value and the second token as a key of the symmetric key encryption mechanism, wherein the combination is at least one of a concatenation of the second raw value and the second token and a hash of the concatenation of the second raw value and the second token.

17. The system of claim 13, wherein the encrypting of the first raw value to generate the first token using the symmetric key encryption mechanism based at least in part on the combination of the second raw value of the second field and the second token resulting from the tokenization of the second raw value includes:

using one of the second raw value and the second token as a key for the symmetric key encryption mechanism; and using the other one of the second raw value and the second token as an initialization vector of the symmetric key encryption mechanism.

18. The system of claim 13, wherein the raw log record was generated responsive to activity of a first of a plurality of organizations assigned different organization identifiers in a multi-tenant system, and wherein the encrypting of the first raw value to generate the first token using the first symmetric key encryption mechanism based at least in part on the combination of the second raw value and the second token is further based on an organization identifier uniquely identifying the first of the plurality of organizations.

* * * * *